United States Patent
Myers et al.

(10) Patent No.: US 12,182,539 B1
(45) Date of Patent: *Dec. 31, 2024

(54) SYSTEMS AND METHODS FOR MODIFYING DECISION ENGINES DURING SOFTWARE DEVELOPMENT USING VARIABLE DEPLOYMENT CRITERIA

(71) Applicant: Citibank, N.A., New York, NY (US)

(72) Inventors: James Myers, New York, NY (US); Miriam Silver, Tel Aviv (IL)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,421

(22) Filed: May 20, 2024

Related U.S. Application Data

(63) Continuation-in-part of application No. 18/535,001, filed on Dec. 11, 2023, now Pat. No. 12,045,610.

(51) Int. Cl.
    *G06F 8/20* (2018.01)
    *G06F 40/20* (2020.01)

(52) U.S. Cl.
    CPC .......... *G06F 8/20* (2013.01); *G06F 40/20* (2020.01)

(58) Field of Classification Search
    CPC .................................. G06F 8/20; G06F 40/20
    USPC ................. 717/101–121; 706/25–45, 25–25
    See application file for complete search history.

(56) References Cited

U.S. PATENT DOCUMENTS

| | | | | |
|---|---|---|---|---|
| 6,169,981 B1 * | 1/2001 | Werbos | ........... | G05B 13/0285 706/26 |
| 6,546,545 B1 * | 4/2003 | Honarvar | ........... | G06Q 10/10 706/45 |
| 7,822,621 B1 * | 10/2010 | Chappel | ........... | G06Q 10/10 706/45 |
| 10,157,355 B2 * | 12/2018 | Johnson | ........... | G06Q 10/1095 |
| 10,276,170 B2 * | 4/2019 | Gruber | ........... | G06F 16/9537 |
| 10,554,738 B1 * | 2/2020 | Ren | ........... | G06F 9/4818 |
| 10,607,141 B2 * | 3/2020 | Jerram | ........... | G10L 15/08 |

(Continued)

OTHER PUBLICATIONS

Rattanasawad et al, "A Review and Comparison of Rule Languages and Rule-based Inference Engines for the Semantic Web", IEEE, pp. 1-6 (Year: 2013).*

(Continued)

*Primary Examiner* — Anil Khatri
(74) *Attorney, Agent, or Firm* — Foley & Lardner LLP

(57) ABSTRACT

Systems and methods provide a first deployment criterion for deploying modified decision engines. A first existing decision engine is accessed, as well as a first modified decision engine that includes rule data generated by an artificial intelligence model based on the first existing decision engine. A first difference between a first output and a first modified output is determined, where the first output is generated by the first existing decision engine and the first modified output is generated by the first modified decision engine. A first selected decision engine is deployed to process subsequent data items to produce subsequent outputs, based on whether the first difference satisfies first deployment criterion. When metric generated based on the subsequent outputs satisfies a criterion modification condition, the artificial intelligence model is used to generate a second deployment criterion, wherein a second selected rule-based decision engine is deployed based on the second deployment criterion.

20 Claims, 7 Drawing Sheets

(56) References Cited

U.S. PATENT DOCUMENTS

| | | | |
|---|---|---|---|
| 10,949,337 B1* | 3/2021 | Yalla | G06N 20/00 |
| 11,315,196 B1* | 4/2022 | Narayan | G06F 18/2193 |
| 11,562,078 B2* | 1/2023 | Sabourin | G06F 9/547 |
| 11,663,662 B2* | 5/2023 | Chen | G06Q 40/03 |
| | | | 705/38 |
| 11,681,610 B2* | 6/2023 | Chang | G06F 11/3688 |
| | | | 714/26 |
| 11,842,408 B1* | 12/2023 | Martinez | G06N 5/01 |
| 11,874,934 B1* | 1/2024 | Rao | G06F 21/577 |
| 2020/0133711 A1* | 4/2020 | Webster | G06F 8/30 |
| 2024/0054233 A1* | 2/2024 | Ohayon | G06F 21/577 |

OTHER PUBLICATIONS

Verma et al, "Integration of Rule based and Case based Reasoning System to Support Decision Making", IEEE, pp. 106-108 (Year: 2014).*

Vereschak et al, "Trust in AI-assisted Decision Making: Perspectives from Those Behind the System and Those for Whom the Decision is Made", ACM, pp. 1-14 (Year: 2024).*

Cuadrado et al, "An Autonomous Engine for Services Configuration and Deployment", IEEE, pp. 520-536 (Year: 2012).*

Halvoník et al, "Large Language Models and Rule-Based Approaches in Domain-Specific Communication", IEEE, pp. 107046-107058 (Year: 2024).*

Vartak et al "Modeldb: A System for Machine Learning Model Management", ACM, pp. 1-3 (Year: 2016).*

* cited by examiner

100

```
pseudo                                              Copy code

RULE "Age Check"
WHEN
   User.age >= 18
THEN
   Actions:
      - Allow access to the website
      - Grant user privileges
END RULE RULE "Discount Calculation"
WHEN
   User.totalPurchaseAmount > 1000
THEN
   Actions:
      - Apply a 10% discount to the total
END RULE
```

150

```
rule                                                Copy code when
   $order: Order(totalAmount > 1000)
then
   $order.applyDiscount(10); // Apply a 10% discount to the order
end
```

FIG. 1

SYSTEMS AND METHODS FOR MODIFYING DECISION ENGINES DURING SOFTWARE DEVELOPMENT USING VARIABLE DEPLOYMENT CRITERIA

CROSS-REFERENCE TO RELATED APPLICATION

This application is a continuation-in-part of U.S. patent application Ser. No. 18/535,001, filed Dec. 11, 2023, which is incorporated herein by reference in its entirety.

BACKGROUND

A rule engine is a software system or component designed to process and execute a set of predefined rules to make decisions, perform actions, or provide automated responses. These rules are typically expressed in a formal, structured way (e.g., using specified script languages, rule conditions, rule actions, structured rules, etc.) and can be used to automate complex decision-making processes in various domains. However, modifying rule engines can pose several technical challenges, depending on the complexity of the system and the specific requirements of the modification. For example, rule engines often interact with other components and systems in an organization's technology stack, so modifying the rule engine may introduce compatibility issues with other software, application programming interfaces (APIs), and/or data sources. Ensuring that the modified rule engine can seamlessly integrate with existing systems can be technically challenging. As another example, rule engines rely on a current rule base, rule sets, and/or conditions to make decisions. When modifying a rule engine, the system needs to migrate data and rules from the old system to the new one. Ensuring a smooth and accurate data migration process can be technically complex, especially if the data structures have changed. As yet another example, rule engines manage highly complex rule sets with dependencies and interactions. Modifying such rule sets while maintaining their logic and ensuring that they function correctly can be technically demanding. In view of these technical challenges, complexities, and demands, artificial intelligence may provide for improvements in modifying rule engines.

Artificial intelligence, including, but not limited to, machine learning, deep learning, etc. (referred to collectively herein as "artificial intelligence models," "machine learning models," or simply "models"), refers to a wide-ranging branch of computer science concerned with building smart machines capable of performing tasks that typically require human intelligence. Key benefits of artificial intelligence are its ability to process data, find underlying patterns, and/or perform real-time determinations. Nonetheless, attempting to use an artificial intelligence-based solution in practical applications such as modifying rule engines raises novel technical problems.

SUMMARY

Despite the benefits of artificial intelligence, artificial intelligence solutions for modifying decision engines, including rule engines, have been hindered by several technical problems. For example, one approach to applying artificial intelligence to modifying decision engines would be to train an artificial intelligence model to directly create or modify the decision engine. However, as stated above, decision engines are often complex; thus, any model used to do so would need to be able to interpret these complexities.

One model that may potentially interpret this complexity would be an unsupervised model. For example, unsupervised models, such as deep neural networks, are incredibly complex, with millions or even billions of parameters. These models may learn patterns and relationships in data (e.g., relationships in high-dimensionality data) that may be difficult for humans to comprehend and/or visualize. Unfortunately, these models are considered "black boxes" because they do not provide insight into how they arrived at a particular decision. They learn from data, but the internal workings of the model are not transparent or easily interpretable. This creates a novel technical problem when applying unsupervised models to modifying decision engines, which require explainability in the results. That is, the system needs to be able to describe how a decision engine was modified and/or how a particular result was derived.

Accordingly, systems and methods are described herein for novel uses and/or improvements to artificial intelligence applications requiring explainability such as modifying decision engines. As one example, systems and methods are described herein for modifying decision engines using generated proxy models that mimic the format and structure of the existing decision engines. For example, as opposed to training a model to directly create or modify the decision engine, the system may train a model to modify script of the existing decision engine. By training the model to modify the script of the existing decision engine as opposed to directly creating or modifying the decision engine, this "proxy" model mimics the format and structure of the existing decision engines (e.g., mimics the script language, rule conditions, rule actions, structured rules, etc.). Moreover, as the results of the proxy model consist of script that mimics the proxy model, this script can be reviewed and is thus explainable.

However, using the generated proxy model to modify script of the existing decision engine creates yet another novel technical problem. For example, model development of a model typically concludes with a validation step whereby testing data is used to determine that a given model is sufficiently trained (e.g., the testing data is used to verify that the results for the testing data match the results that would be expected based on the training data). As such, in a conventional training routine, validation would occur by determining that the results of the proxy model match the results of the existing decision engine. Yet training the proxy model to match the existing decision engine would serve no purpose (as the existing decision engine is already known and/or explainable). At best, the proxy model would continuously write and/or rewrite the script of the existing decision engine without a determined goal.

The systems and methods address this additional novel technical problem by instituting a model deployment criterion. The model deployment criterion indicates a difference in a value against which the proxy model may be measured to determine when, if ever, the proxy model should be deployed to replace the existing decision engine. The model deployment criterion may be keyed to the proxy model (e.g., based on a difference in its size, throughput speed, number of changes, etc.), the existing decision engine (e.g., based on a difference in its age, update occurrences to its rule base, etc.), and/or comparisons between models (e.g., based on differences in results, throughput speed, efficiency, etc.). For example, as opposed to directly comparing the modified decision engine to the existing decision engine, or even an output of the modified decision engine to an output of the existing decision engine, the system compares a difference in the outputs to the model deployment criterion. By doing so, the technical problems related to validating the proxy model are overcome as the validation indicates whether the differences in the proxy model and the existing model correspond to the model deployment criterion. Furthermore, systems and methods described herein enable this model deployment criterion to be changed, enabling new relationships between the proxy model and existing model to be discovered and implemented.

In some aspects, the systems and methods described herein modify rule engines using generated proxy models with predefined model deployment criteria that mimic the format and structure of the existing rule engines as described. For example, the system may determine a first model deployment criterion. The system may determine, using a first artificial intelligence model, a first modified script for a first modified rule engine based on a first script extracted from a first existing rule engine, wherein the first artificial intelligence model is trained to generate rule engine script based on comparisons of historic script interpretations of historic rule bases for historic rule engines. The system may determine a first difference between a first output and a first modified output, wherein the first existing rule engine processes first rule base data to generate the first output, and wherein the first modified rule engine processes the first rule base data with the first modified script to generate the first modified output. The system may compare a first difference between the first output and the first modified output to the first model deployment criterion. The system may determine whether to deploy the first modified rule engine based on comparing the first difference to the first model deployment criterion.

In some aspects, systems and methods described herein modify decision engines (e.g., rule-based decision engines) using variable model deployment criteria. For example, a system may determine a first deployment criterion for deploying modified decision engines. A first existing decision engine is accessed, as well as a first modified decision engine that includes rule data generated by an artificial intelligence model based on the first existing decision engine. A first difference between a first output and a first modified output is determined, where the first output is generated by the first existing decision engine and the first modified output is generated by the first modified decision engine. A first selected decision engine is deployed to process subsequent data items to produce subsequent outputs, based on whether the first difference satisfies first deployment criterion. When one or more metric values generated based on the subsequent outputs satisfy one or more criterion modification conditions, the artificial intelligence model is used to generate a second deployment criterion, wherein a second selected rule-based decision engine is deployed based on the second deployment criterion.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 1 shows illustrative diagrams for rule engine script and modified rule engine script, in accordance with one or more embodiments.

DETAILED DESCRIPTION OF THE DRAWINGS

Figure 2A:
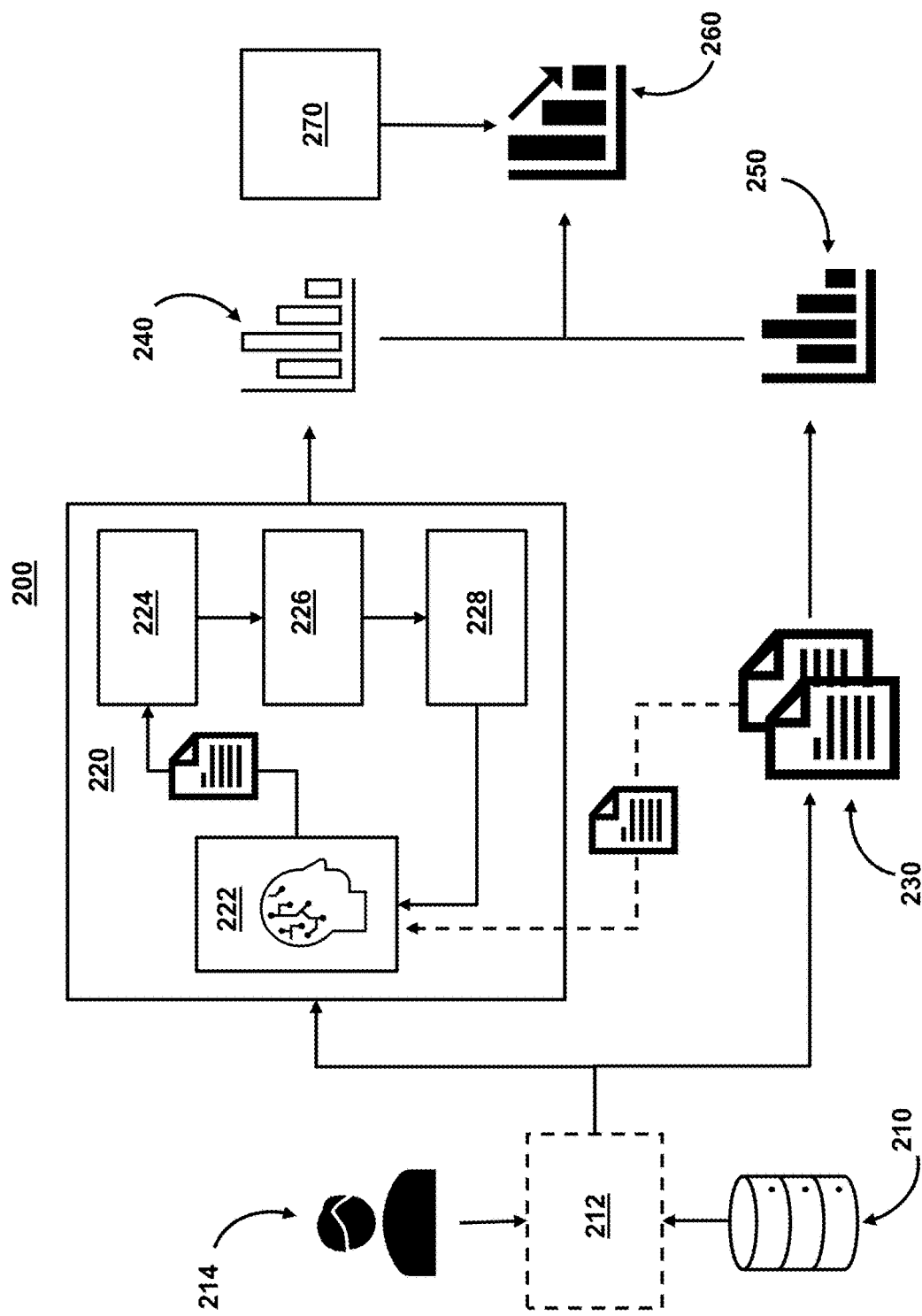
FIG. 2A shows an illustrative diagram for modifying rule engines during software development using generated proxy models, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

As described herein, systems and methods are described herein for novel uses and/or improvements to artificial intelligence applications requiring explainability such as modifying rule engines. As one example, systems and methods are described herein for modifying rule engines using generated proxy models that mimic the format and structure of the existing rule engines. For example, as opposed to training a model to directly create or modify the rule engine, the system may train a model to modify script of the existing rule engine. By training the model to modify the script of the existing rule engine as opposed to directly creating or modifying the rule engine, this "proxy" model mimics the format and structure of the existing rule engines (e.g., mimics the script language, rule conditions, rule actions, structured rules, etc.). Moreover, as the results of the proxy model consist of script that mimics the proxy model, this script can be reviewed and is thus explainable.

For example, the system may train a generative model to improve rules-based decision engines. In such cases, the generative model may be first trained to improve rules generally (e.g., identifying and ingesting relevant data, recognizing rules, creating new rules, running new rules through filters and performance thresholds, and/or outputting revised rules) and then may be reused and tailored to specific rules-based decision engines. Training a generative model to improve rules within a rules-based decision engine involves several steps and considerations. Generative models, such as Transformer-based architectures, generative adversarial networks (GANs) or variational autoencoders (VAEs), aim to learn and generate new data that follows a certain distribution. Transformer-based models: excel at analyzing and generating rule scripts by capturing sequential relationships and contextual dependencies, enabling them to suggest nuanced and explainable rule modifications. As such, the system may gather and preprocess relevant data. This may involve identifying and ingesting datasets that contain information about the rules and their outcomes. In some embodiments, the data may be cleaned, normalized, and prepared for model training. The system may represent the rules and related data in a format suitable for the generative model. This may involve encoding rules, their attributes, and/or associated outcomes into a structured format that the model can understand and learn from. Training the generative model may involve, the system feeding it with the prepared dataset. The model may learn the underlying patterns, relationships, and structures within the rules and associated data. For example, a GAN might learn to generate new rules that adhere to the learned patterns. During fine-tuning transformers based and/or other pertained models learn to apply their pre-trained knowledge to engine-specific data to spot the underlying structure and relationships within the rule system. Once trained, the generative model can recognize existing rules and their patterns. It can also generate new rules by producing outputs that follow similar patterns observed in the training data. This could involve creating rules that conform to certain criteria or constraints. Running the generated rules through filters and performance thresholds is crucial to ensure their quality and effectiveness. Rules that meet certain performance criteria or validation tests are retained, while those that do not meet the specified thresholds are discarded or revised. The generative model's outputs—whether new rules or revised versions—may be integrated back into the rules-based decision engine. These modified rules can improve decision-making by adapting to changing conditions or optimizing performance based on the learned patterns. The system may then tailor a generative model to a specific rules-based decision engine, which may involve training the model on relevant and domain-specific data, adjusting model architecture or parameters to better capture the nuances of the rules, and/or refining the generated rules based on the specific requirements and performance metrics of the decision engine.

By doing so, the system mitigates the technical problems associated with generative artificial intelligence, namely generative models are expensive to create (e.g., computing resources to train), expensive to run (e.g., computing resources), and have low explainability (e.g., have difficulty explaining outcomes, have difficulty tracking & performing audit processes, and/or the same prompts produce different outcomes). The system thus also overcomes many of the technical problems of rules-based engines, namely rules-based decision engines are brittle (e.g., do not adapt when circumstances, data, context change), expensive to replace (e.g., revision requires extensive human analysis), and/or lack potential insights of generative models (e.g., detecting language patterns).

By overcoming these technical problems, the system may use a generative model that is trained to revise rules and may be reused on multiple rules-based decision engines. In doing so, the system may determine known performance indicators (KPIs), data sources, rules, outcomes. For example, KPIs may be measurable values that organizations use to evaluate the success of specific activities, projects, or processes in relation to their strategic goals. KPIs are essential tools for assessing performance, tracking progress, and making informed decisions to improve performance or outcomes. KPIs may directly relate to the goals and objectives of the organization or a specific project. They provide a clear indication of whether these objectives are being met. KPIs may be quantifiable and measurable, allowing for easy tracking and comparison over time. They are typically expressed as numerical values or percentages. KPIs may be easily understood by all stakeholders. They should communicate a clear message about performance without ambiguity. KPIs may have associated timeframes or periods over which they are measured, allowing for monitoring and assessment within specific intervals.

The system may generate new rules based on improving KPIs. These new rules (and/or a KPI associated with them) may comprise a deployment criterion. The system may test new rules for KPI improvements. The system may test new rules against filters (e.g., in order to avoid bad rules/bad outcomes that violate one or more requirements (e.g., anti-discrimination requirements)). For example, the system may determine a difference (e.g., a difference in a KPI) between a first output from an existing rule and a modified output from a rule generated by the generative model. Based on comparing the difference to the first model deployment criterion, the system may determine whether to deploy a modified rule engine.

FIG. 1 shows illustrative diagrams for rule engine script and modified rule engine script, in accordance with one or more embodiments. For example, FIG. 1 includes user interface 100 and user interface 150. As referred to herein, a "user interface" may comprise a human-computer interaction and communication in a device, and may include display screens, keyboards, a mouse, and the appearance of a desktop. For example, a user interface may comprise a way a user interacts with an application, content, and/or a website. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same.

In some embodiments, user interface 100 may present script for an existing rule engine. As described herein, script may be a sequence of instructions or commands written in a programming or scripting language that can be executed by a computer and/or an interpreter. Scripts may be used to automate tasks, perform specific actions, or solve problems within a software application, operating system, and/or other computing environments. Scripts may be shorter and less formal than full-fledged computer programs and are usually written in scripting languages, which are designed for ease of use and rapid development. As described herein, rule engine script may comprise a set of rules and conditions that specify how a system or application should behave in response to certain inputs or events.

Unlike compiled programs, scripts may be interpreted (and generated as described herein) line by line by an interpreter (such as a scripting engine or runtime environment) rather than being compiled into machine code. This makes scripts more portable and flexible but potentially slower. In some embodiments, scripts may be written in high-level programming languages, which are more human-readable and easier to write than low-level languages such as assembly or machine code. Script may be used for automating repetitive tasks, such as file operations, system maintenance, data processing, and more. Script can save time and reduce the risk of human error. In some embodiments, script can be used to customize and extend the functionality of existing software or systems. For example, rule engine script may be used to add interactivity to rule engines, and shell scripts for the rule engine may automate system administration tasks for the rule engine. In some embodiments, the script may respond to events or triggers by executing specific actions in response to certain conditions. For example, rule engine script may be used to generate interpretations of inputs.

User interface 100 includes script from an existing rule engine. While shown as pseudocode, the script may be written in one or more programming/scripting languages such as JavaScript (e.g., which may enable interactive and dynamic web pages), Python (e.g., which may improve simplicity and readability), Bash (e.g., a Unix shell scripting language used for automating system administration tasks in Linux and other Unix-like operating systems), PowerShell (e.g., a scripting language developed by Microsoft for managing Windows operating systems and performing administrative tasks), and/or other programming languages.

User interface 150 includes modified script for a modified rule engine. For example, the modified script may comprise a modified sequence of instructions or commands written in a programming or scripting language that can be executed by the computer and/or the interpreter. For example, the system may automatically rewrite script to modify or generate code automatically based on certain rules, patterns, and/or templates. To do so, the system may use code refactoring, optimization, and/or generating of repetitive code sections. For example, the system may use code generators that are programs that take input data or high-level specifications and produce code based on predefined templates or rules. In another example, the system may use refactoring tools and libraries. The code refactoring may comprise restructuring and improving the existing script with or without changing its external behavior. The primary goal of the code refactoring may be to enhance code quality, readability, maintainability, and often performance by making the code more efficient and easier to understand. For example, the system may split a long function into smaller, more focused methods to improve readability and maintainability. Additionally or alternatively, the system may replace hard-coded numbers or strings with named constants or configuration variables to improve code maintainability. Additionally or alternatively, the system may reorganize classes, modules, and packages to follow a cleaner and more logical structure.

In some embodiments, the modified script in user interface 150 may be generated using generative artificial intelligence. Generative artificial intelligence is a subset of artificial intelligence that specifically deals with the creation of new content, such as images, text, music, and more. Generative artificial intelligence systems are designed to produce output that is not explicitly programmed, but rather generated based on patterns and information learned from existing data. Generative artificial intelligence may include semi-supervised or supervised learning. For example, in supervised learning the model may be trained to predict next word/sentence based on training data (e.g., labelled data featuring potential word/sentences). In some embodiments, the system may also use large language model (LLM), which is a type of artificial intelligence model that is designed to process and understand natural language. It is trained on massive amounts of text data, using advanced machine learning algorithms to learn patterns and relationships between words, phrases, and sentences.

In some embodiments, the system may determine a scripting language used by the existing rule engine and/or generate modified script in the same scripting language. Alternatively, the system may determine a scripting language used by the existing rule engine and/or generate modified script in a different scripting language. For example, the system may determine that a different scripting language is more efficient than a current scripting language. To determine the efficiency of a scripting language, the system may compare one or more factors. For example, the system may consider a task or a domain. The nature of the task may play a crucial role in choosing a scripting language. Different languages are better suited for different domains. For example, Python is often chosen for data analysis and scientific computing, while JavaScript is commonly used for web development. In another example, the system may consider an existing ecosystem. If a project needs to integrate with existing software or systems, it may be advantageous to choose a scripting language that is well-supported and compatible with those systems. This can simplify integration and reduce development time. In another example, the system may consider a development team's expertise. The knowledge and experience of the development team are important. Using a scripting language that the team is already familiar with can lead to faster development and better code quality. In another example, the system may consider performance requirements. Some scripting languages may be more performant for certain tasks than others. If a project has specific performance requirements, the system may consider which scripting language can meet those requirements. In another example, the system may consider community support. The availability of community support, libraries, and documentation can greatly impact development speed and problem-solving. Popular languages tend to have more extensive resources available. In another example, the system may consider security. Depending on the nature of the project, security and safety considerations may influence the choice of scripting language. Some languages have built-in features that make it easier to write secure code. In another example, the system may consider portability and/or cross-platform compatibility. If the system needs the script to run on multiple platforms, the system may choose a language that is known for its portability and has support for the platforms you require. In another example, the system may consider project requirements. Specific project requirements, such as the need for multi-threading, networking, or GUI (graphical user interface) development, can guide the choice. Some scripting languages are better suited for certain types of applications. In another example, the system may consider scalability. The system may consider whether the scripting language and associated tools are suitable for scaling the rule engine as it grows.

In some embodiments, the system may determine a level of compatibility of a scripting language with other script in the existing rule engine. For example, the level of compatibility may influence the efficiency of the scripting language. To determine compatibility, the system may examine the features and syntax of the scripting languages. The system may compare them to the existing scripts and the rule engine to determine whether they are compatible. The system may ensure that the language supports the operations, data types, and constructs needed by the rule engine. As another example, the system may check whether the scripting language can interoperate with the existing scripts and rule engine components. This includes evaluating how data can be shared between the languages and whether the language can call functions or methods from the rule engine or other scripts. As another example, the system may verify that the scripting language can work with the data formats used by the rule engine. This may involve parsing or serializing data in a compatible way. As another example, the system may consider whether the scripting language has libraries or frameworks that can help with integration. For example, if the rule engine uses a specific protocol or data format, a scripting language with a library for that protocol can simplify integration.

In some embodiments, the system may compare performance characteristics of a scripting language with other script in the existing rule engine. For example, the performance characteristics may influence the efficiency of the scripting language. The system may assess the performance characteristics of the scripting language to ensure that it can meet the performance requirements (e.g., data formats, throughput speed, security vulnerabilities, etc.) of the existing rule engine. If the scripting language is significantly slower, it may not be compatible for performance-critical components. For example, performance characteristics of a scripting language may refer to how the language behaves in terms of execution speed, memory usage, startup time, and resource efficiency. These characteristics play a significant role in determining whether a scripting language is suitable for a specific task or application. The execution speed of a scripting language refers to how quickly it can process and execute code. Faster execution is desirable for applications where performance is critical. Some languages, such as Python, are known for being slower than others, while languages such as JavaScript and Lua are generally faster. Memory usage refers to the amount of system memory a scripting language and its running programs consume. Languages that are more memory-efficient use less memory, which can be important for applications running on resource-constrained environments. The time it takes to start a scripting language interpreter or runtime environment can impact the responsiveness of applications. Quick startup times are crucial for certain types of applications, such as command-line tools or server processes. Resource efficiency encompasses factors such as CPU (computer processing unit) utilization and disk input/output (I/O). Some scripting languages are better at managing system resources and can minimize the impact on the overall system.

In some embodiments, modified script for a modified rule engine may include additional rules, functions, and/or other script components. For example, the system may generate modified script by adding, removing, and/or otherwise altering content in script for an existing rule engine. For example, as shown in FIG. 1, the system may generate a new function that comprises additional variables, rules, and/or functions. For example, the system may generate modified script based on the rules extracted from the script shown in user interface 100. As one example, natural language processing algorithms can analyze unstructured text sources, such as existing script, security policies, guidelines, and/or technical documentation, to extract key concepts, patterns, and relationships. These extracted elements form the foundation for generating input validation rules. As a practical example, the system may analyze a company's security policy documents, extracting key phrases related to data input requirements and restrictions. The system may identify terms like "password complexity," "data format specifications," and "acceptable characters." These extracted concepts may serve as the basis for creating input validation rules.

Based on the extracted elements, the system can generate formal rules using a specific rule language, such as regular expressions or decision trees. These rules may define the acceptable and unacceptable formats or values for user inputs. The system may then encode these rules in the modified script. As a practical example, using the extracted concepts, the system generates formal input validation rules. For instance, the system might create a regular expression specifying the required password format or a decision tree outlining the conditions for valid user inputs. These rules may then define the criteria for acceptable data inputs.

Some embodiments herein describe modifying rule engines as an example type of decision engine that can be automatically modified during software development. However, other embodiments can perform similar modifications to other decision engines. For example, some decision engines use one or more decision trees to process data and generate outputs. These decision trees can be modified by changing attributes and threshold values on which to split data at each node, by changing the structure of the tree (e.g., depth and number of nodes of the tree), by changing leaf node labels, or by changing the number of decision trees that are used in a given decision tree-based decision engine. Other decision engines can employ any or a combination of rules, machine learning-based techniques, or probability-based techniques, including Bayesian methods (e.g., Bayesian networks or Bayesian inference), random forests, fuzzy logic, graphical models, Markov-based models, or hybrid models. Decision engines could also incorporate:

1. neural networks, specifically deep learning models, which are proficient in handling complex patterns and large datasets.
2. Support vector machines (SVMs) offer another method for classification and regression tasks, known for their effectiveness in high-dimensional spaces.
3. Reinforcement learning algorithms can optimize decision-making through trial and error, learning optimal actions based on rewards received from the environment.

Additionally, decision engines can be augmented with evolutionary algorithms, which simulate natural selection processes to iteratively improve decision rules or parameters.

Ensemble methods, like boosting and bagging, can be used to enhance prediction accuracy by combining the strengths of multiple learning algorithms.

Some decision engines include two or more types of engines.

A generative model, such as a large language model (LLM), is used to generate and modify decision engines. The generative model uses existing decision engines, analysis of the outputs of existing decision engines, and external data sources to generate rule data. Rule data is data that is usable by a computer system to process input data and to make a decision based on the input data. For example, rule data in a rule engine can include rule script, as described with respect to FIG. 1. In a decision tree-based decision engine, rule data can include attributes and a threshold value on which to split data at a node of the decision tree, as well as a structure of the decision tree and the number of decision trees in the decision engine. A Bayesian network-based decision engine can have rule data that identifies variables at a given node, a probability for each variable at the node, and a structure of connections between nodes. Rule data can also include an expansive mutation of the knowledge base, where generating rule data can also involve modifying the knowledge base, integrating newly derived rules or modified parameters that reflect new understandings or changes in the data landscape. Transformer-based models can be integrated into the decision-making process—allowing detecting signals/handling large datasets and processing complex patterns due to their ability to learn contextual relationships over long sequences. This allows dynamically adjusting decision engines by continuously learning and modifying rule sets based on ongoing interactions and feedback, improving the adaptability and accuracy of decision-making processes. Rule data can also include an explanation of each rule, in some cases. For example, when generating rule data, an LLM can be prompted to output an explanation of what problem the rule solves and how the rule solves that problem.

FIG. 2A shows an illustrative diagram for modifying rule engines during software development using generated proxy models, in accordance with one or more embodiments. For example, FIG. 2 comprises system 200. System 200 may comprise a software development workflow used for modifying rule engines using generated proxy models with predefined model deployment criteria that mimics formats and structures of existing rule engines.

System 200 may include rule base 210. Rule base 210 may be a central component that stores and manages a collection of rules. Rule engines are designed to evaluate and apply rules based on certain conditions and trigger actions when those conditions are met. These rules are stored in the rule base. The rule base plays a pivotal role in decision-making processes, business logic, and automation. Rule engines are commonly used in various domains, including business process management, decision support systems, expert systems, fraud detection, and more. The structure and capabilities of the rule base can vary depending on the specific rule engine and its intended use cases. The goal is to provide a mechanism for expressing and executing business logic and decision-making rules in a way that is separate from the core application code, allowing for easy adaptation and maintenance of the rules as business requirements change. Rule base 210 may contain a set of rules, each of which consists of conditions and actions. Conditions specify when a rule should be triggered, while actions define what should happen when the rule is activated.

System 200 may receive input 212 for processing. Input 212 may correspond to a determination required by system 200, training data for system 200, and/or other information input into system 200 to generate an output (e.g., output 240 or output 250). For example, system 200 may receive a request to determine whether or not to extend credit to a user, a request to detect potential fraud, etc. For example, in the context of a loan approval process, system 200 may determine whether to approve a loan based on a set of predefined rules (e.g., from rule base 210), criteria (e.g., user specific criteria), and algorithms (e.g., as found in rule engine 230). Input 212 may include details and/or other characteristics specific to the required determination as well as one or more rules from rule base 210. For example, system 200 may input a first script (e.g., from rule engine 230) into proxy model 220 to determine a modified script for a modified rule engine, wherein proxy model 220 is trained to generate rule engine script based on comparisons of historic script interpretations of historic rule bases for historic rule engines. System 200 may also input the rule base data (e.g., input 212) into rule engine 230. Rule engine 230 may process the rule base data to generate a first output (e.g., output 250). System 200 may also input the rule base data into the modified rule engine (e.g., proxy model 220), wherein proxy model 220 processes the first rule base data with the first modified script to generate a first modified output.

For example, input 212 may comprise a feature input. A feature input may be a specific piece of data or an attribute that is used as an input to a machine learning model or a data analysis task. Features are essential components of data used to make predictions or classifications or to perform various analyses. They represent the relevant information or characteristics of the data that the model or algorithm uses to make decisions or generate insights. The feature input may comprise information about a user and/or a specific request or determination task. For example, input 212 may be based on information from profile 214. The system may monitor content generated by the user to generate user profile data. As referred to herein, "a profile" and/or "profile data" may comprise data actively and/or passively collected about a user and/or request. For example, the profile data may comprise content generated by the user/request and a user/request characteristic for the user/request. A profile may be content consumed and/or created by a user/request.

Profile data may also include a data characteristic. As referred to herein, "a data characteristic" may include any information about a user, request, and/or information included in a directory of stored user settings, preferences, and information for the user/system. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on the system actively or passively monitoring.

System 200 may process input 212 using proxy model 220 and rule engine 230. For example, rule engine 230 and proxy model 220 may receive and process input 212 to generate output 240 and output 250. Rule engine 230 may comprise a software component or system that is designed to evaluate, interpret, and/or execute a set of predefined rules (e.g., from rule base 210) to make decisions or perform actions (e.g., in response to input 212). Rule engine 230 may be used in a variety of applications, from business and finance to artificial intelligence and automation, to simplify and manage complex decision-making processes based on a set of conditions and actions.

Proxy model 220 may comprise generative model 222. A generative model may be a type of artificial intelligence model designed to generate new data (e.g., script for rule engine 230), often in the form of text, images, audio, or other media, that is similar to existing data or exhibits some desired characteristics. For example, proxy model 220 may generate script as shown in user interface 150 (FIG. 1). A generative model is capable of producing content that is not copied or directly retrieved from a dataset but is instead created based on patterns and knowledge learned from training data. For example, generative model 222 may comprise an artificial intelligence model that determines modified script for a modified rule engine based on script extracted from an existing rule engine (e.g., rule engine 230). Generative model 222 may be trained to generate rule engine script based on comparisons of historic script interpretations of historic rule bases for historic rule engines. In one example, generative model 222 may comprise one or more Generative Adversarial Networks (GANs). GANs consist of two neural networks, a generator and a discriminator, which are trained simultaneously in a competitive manner. The generator attempts to create data that is indistinguishable from real data, while the discriminator tries to differentiate between real and generated data. This adversarial training process results in the generator producing increasingly realistic data. Additionally or alternatively, generative model 222 may comprise one or more Variational Autoencoders (VAEs). VAEs are used for generating data by learning a probabilistic distribution of data in a lower-dimensional space. VAEs are particularly useful for generating diverse data samples. Additionally or alternatively, generative model 222 may comprise one or more Recurrent Neural Networks (RNNs). RNNs are a type of neural network used for sequence-to-sequence tasks. They can be used to generate sequences of data, such as text or music. Additionally or alternatively, generative model 222 may comprise one or more transformer models. Transformer-based models, such as GPT (Generative Pre-trained Transformer) and BERT (Bidirectional Encoder Representations from Transformers), have demonstrated strong generative capabilities for natural language generation tasks.

In some embodiments, generative model 222 is a large language model (LLM). The LLM receives input data in the form of text, numerical data, images, videos, audio, graphs, or other multi-modal data. Based on the input data, the LLM generates rule script for rule engine 230. Some embodiments of the LLM are augmented with external data in order to generate rule script. For example, generative model 222 can use retrieval-augmented generation (RAG), in which the LLM retrieves facts from a repository of external sources to help the LLM generate the rule script. A prompt into the LLM identifies one or more data sources that are to be used by the LLM while generating the rule script, either by directly providing the data sources with the prompt or by identifying a location where the LLM can access the data sources. For example, the LLM can access a repository of external sources that include information such as policies of an organization in which the system 200 operates; policies of a city, state, or country in which the rule script will be deployed; documents that identify goals of the organization; datasets that indicate how rule script is used or how the results of certain rules affect various outcomes; or the like. For example, based on a policy document indicating certain nondiscrimination policies of an organization or locality, the LLM can generate rule script that does not violate these policies.

An LLM can additionally or alternatively be augmented by prompts that directly provide information to the LLM for the LLM to use as it generates rule script, or that instruct the LLM to perform in certain ways. For example, the LLM can be caused to generate rule script based on prompt engineering strategies such as chain-of-thought (CoT) prompting, ReAct prompting (reason, act), directional stimulus prompting, or generative knowledge prompting. CoT prompting can be used, for example, to achieve transparent reasoning in rule generation. Each CoT prompt into the LLM breaks a problem down into small logical steps that are provided to the LLM either through zero-shot or few-shot inputs. The LLM can be prompted in this way to identify potential red flags based on input features and external information. For example, the LLM can be instructed to explain why it generated the rule script that it did, what problem is solved by the rule script, and/or what the outcome of the rule script is expected to be. ReAct prompt engineering similarly instructs an LLM to document its reasoning and action in rule formulation. For example, when generating rule script related to detecting cybersecurity fraud, the LLM is first prompted to reason about potential fraud indicators present in a set of data. The LLM is then prompted to act by specifying a rule that can detect such indicators, resulting in a rule that is reasoned, actionable, and explainable. Directional stimulus prompting similarly instructs the LLM to document reasons and actions, but directed towards specific reasons or actions. In the cybersecurity fraud detection example, directional stimulus prompting can instruct an LLM to focus on indicators of specific types of fraud. Finally, generative knowledge prompting can be used to cause an LLM to enhance rule understandability with explanations. Beyond generating rule script, the LLM can be prompted to provide a plain language explanation or rationale for a rule that can help users understand the logic behind a rule.

Proxy model 220 may have additional components for generating modified script. For example, proxy model 220 may comprise filter 224. Filter 224 may employ a variety of techniques and technologies to identify and block content that is considered inappropriate, offensive, and/or harmful. Filter 224 may use keyword filtering where filters scan text-based content for specific keywords, phrases, or patterns associated with objectionable content. These keywords are often part of a blacklist. If a match is found, the content is flagged or blocked. Additionally or alternatively, filter 224 may comprise filters that can analyze images and videos to identify explicit or objectionable content. This can involve image recognition, facial detection, or algorithms that recognize nudity or violence. Additionally or alternatively, filter 224 may comprise filters that categorize content into predefined categories, such as adult, gambling, violence, personally identifiable information, and/or hate speech. The system can set filtering rules based on these categories. Additionally or alternatively, filter 224 may comprise lists of known objectionable websites, domains, or URLs. These lists may be updated regularly. Additionally or alternatively, filter 224 may comprise models that can be trained to recognize patterns of objectionable content. They can adapt and improve their detection capabilities over time.

The system may categorize a given rule based on its content, outcome, and/or effect. For example, the system may train a model to categorize rules based on the content of the rules (e.g., whether the rule itself includes a blacklisted term) and/or the outcome or effect (e.g., whether an outcome or effect of a rule corresponds to a blacklisted term). For instance, the system may use classification algorithms such as Support Vector Machines (SVM), Decision Trees, and/or Neural Networks can learn patterns from labeled data to categorize rules according to specific criteria, effects, and/or outcomes. The system may also use NLP techniques to understand and process human language. Through techniques like text classification or sentiment analysis, the system can categorize rules based on their linguistic content. NLP models can identify keywords, phrases, and/or semantic structures to determine the category of a rule. The system may also use NLP to summarize the outcome and/or effect of a given rule. The system may then use text classification or sentiment analysis on the summarized content to determine if the summarized content comprises objectionable information. The system may also categorize rules by applying predefined logical rules or conditions. In such cases, the system may use a set of if-then statements or logical rules to categorize rules based on specific criteria, outcomes, and/or effects. The system may also use semantic analysis to understand the meaning and relationships between different rules in order to generate ontologies of rules. Ontologies define relationships between concepts and can help categorize rules based on their semantic connections, making it possible to organize rules based on their meanings and context. The system may then filter rules based on the ontologies and/or the relationships therein. For example, the system may determine a first rule is filtered out based on an objectionable effect. The system may then filter out a second rule based on its shared ontology with the first rule. The system may also categorize rules by extracting meaningful features related to their content, outcome, and/or effect, and then use these features to train models for classification or clustering.

Proxy model 220 may also include validator 226. Validator 226 may perform a validation process for modified script. For example, proxy model 220 may validate a script before implementing it in a rule engine to ensure that the script is error-free, adheres to the syntax and rules of the rule engine, and will execute as intended. The specific process of script validation can vary depending on the rule engine and the scripting language used. In some embodiments, the script is subjected to a syntax check to ensure that it follows the correct grammar and structure of the scripting language. Syntax errors, such as missing semicolons, unbalanced parentheses, or invalid keywords, are identified during this step. In some embodiments, static analysis tools can be used to inspect the script for potential issues without executing it. These tools can identify variables that are used but not defined, unused variables, and other potential problems. In some embodiments, proxy model 220 may use specific scripting language or dialect (e.g., based on rule engine 230). Validation may include checking that the script adheres to the syntax and rules defined by the rule engine. For example, it may ensure that the script uses the appropriate functions or methods provided by the rule engine. If the script relies on external libraries or dependencies, a validation process may include checking that these dependencies are correctly installed and available for use. In some cases, the script may be executed in a simulated environment or debugged to identify issues that might not be evident during static analysis. Security checks, including scanning for vulnerabilities, injection attacks, and other security issues, may also be performed, especially when the script will process sensitive data. Once the script has passed the validation process, proxy model 220 can safely implement the modified script into a rule engine (e.g., rule engine 230). However, ongoing testing and monitoring may be performed by system 200 to ensure that the script performs as expected and remains free from errors as the application evolves.

Proxy model 220 may also (in some embodiments) include manual review 228. For example, manual review 228 may comprise proxy model 220 generating for display (e.g., in a user interface) a modified script for user review. For example, manual review 228 may include filters allowing users to report objectionable content. Once reported, the content can be reviewed and, if confirmed, added to the filter's blacklist. Manual review 228 may also include filters that can be configured with custom rules defined by users or administrators. These rules specify what content is considered objectionable and how to handle it. Manual review 228 may also include filters that can incorporate user feedback to improve accuracy. Users can mark false positives and false negatives, helping the system to adapt and refine its filtering.

Proxy model 220 may generate output 240. For example, proxy model 220 may generate output 240 by inputting the first rule base data (e.g., input 212) into proxy model 220, wherein proxy model 220 processes the first rule base data with the first modified script (e.g., generated by generative model 222) to generate a first modified output. In some embodiments, the output may comprise generated rules. For example, the generated rules may be integrated into various security systems, including firewalls, web servers, and/or intrusion detection systems. In such cases, these rules may act as checkpoints, evaluating user inputs against the defined criteria and preventing invalid or malicious data from entering the system. As a practical example, the generated rules may be integrated into a web application firewall. When a user submits a form, the firewall may evaluate the input against the defined rules, allowing only inputs that meet the specified criteria to pass through. This may prevent SQL injection, cross-site scripting, and/or other malicious activities.

System 200 may then compare output 240 and output 250 at selection engine 260. For example, selection engine 260 may compare two rule engine scripts or rule sets by analyzing the structure, logic, and/or content of the scripts to identify similarities, differences, and potential conflicts. The exact method for comparing rule engine scripts may vary depending on the rule engine, the specific rules language, and the objectives of the comparison (e.g., a model deployment criterion). In some embodiments, selection engine 260 may compare rule engine scripts to perform a syntax check to ensure that both scripts are valid and follow the correct grammar and structure of the rule engine's scripting language. This may include checking for errors such as missing semicolons, unmatched parentheses, or invalid keywords. Additionally or alternatively, selection engine 260 may perform a structure comparison by analyzing the overall structure of the scripts. This may include checking the organization of rules, conditions, and actions. Differences in rule ordering, grouping, or naming may be identified. Additionally or alternatively, selection engine 260 may compare individual rules to identify similarities and differences. This may involve comparing the conditions and actions of each rule. Rules with identical conditions and actions may be considered similar. Additionally or alternatively, selection engine 260 may identify potential conflicts between scripts and/or rules. Conflicts may occur when two or more rules can be triggered simultaneously, leading to ambiguous behavior. These conflicts need to be resolved to ensure that the rule engine behaves predictably. Additionally or alternatively, selection engine 260 may analyze how variables and data are used within the scripts. Differences in variable names, data sources, or data types should be highlighted. Additionally or alternatively, selection engine 260 may compare the logic of the scripts by checking for differences in how conditions are structured and how actions are implemented. For example, differences in conditional logic or action sequences can be flagged. Additionally or alternatively, selection engine 260 may determine what errors (or the number thereof) occur and how error handling and exception handling are implemented within the scripts. Differences in how errors are caught, reported, or handled may be identified.

For example, the system may adapt to the specific context of the data being validated, taking into account factors such as the type of input, the source of the input, and/or the user's privileges. This context-aware approach ensures that validation rules are tailored to the specific requirements of the system and its users. As a practical example, the system may consider the context of user inputs. For sensitive operations, the system may generate stricter validation rules, while allowing more flexibility for less critical actions. For example, the system might enforce stronger validation for financial transactions and less stringent rules for general user profile updates.

In some embodiments, if version control is in place, selection engine 260 may compare script versions to identify changes and updates made over time. This is particularly useful for tracking script evolution. For example, the system may continuously monitor and analyze new data sources, such as threat intelligence feeds, vulnerability reports, and industry best practices. By identifying emerging threats and trends, the system may suggest modifications or additions to the existing validation rules, ensuring that systems remain up-to-date and protected against evolving attack methods. As a practical example, the system may continuously monitor threat intelligence feeds and identifies new attack patterns. If it detects a novel threat that existing rules do not cover, the system may suggest updates to the validation rules. For instance, if a new type of injection attack becomes prevalent, the system may recommend adjustments to input validation criteria to mitigate this specific threat.

In some embodiments, selection engine 260 may run the scripts in a controlled environment to identify behavioral differences and inconsistencies that may not be evident during a static comparison. The system may run the scripts to determine differences in outputs (e.g., determine how the same input results in different outputs). For example, the system may compare two scripts to determine how the two scripts interpret rules in rule base 210 differently. In some embodiments, the system may determine a difference in the performance of a model. For example, system 200 may determine one or more performance metrics for a rule engine based on the scripts. For example, the system may determine a first performance metric for the existing rule engine and a second performance metric for the modified rule engine.

Performance metrics for a rule engine may refer to measures used to evaluate the effectiveness, efficiency, and/or quality of the rule engine's operations and decision-making. These metrics help assess how well the rule engine is performing its intended tasks, such as processing rules, making decisions, and/or handling data. The performance metrics may be used to identify areas of improvement and ways to optimize the rule engine's behavior.

In some embodiments, a performance metric may comprise throughput, latency, scalability, rule evaluation time, resource utilization, rule complexity, hit rate, false positive rate, false negative rate, rule authoring time, error rate, rule coverage, and/or rule execution. Throughput measures how many rules or rule evaluations the engine can process in a given time period. It is usually expressed as rules per second or transactions per second. Higher throughput often indicates better performance. Latency measures the time it takes for the rule engine to process a request or rule evaluation, typically in milliseconds or microseconds. Lower latency is desirable, as it indicates faster decision-making. Scalability assesses the rule engine's ability to handle an increasing workload by adding more resources, such as CPU, memory, or servers. It measures how well the engine can maintain its performance as demand grows. Rule evaluation time measures the time it takes to evaluate a single rule or set of rules. It helps identify rules that are particularly time-consuming and may need optimization. Resource utilization metrics, such as CPU and memory usage, assess how efficiently the rule engine uses available resources. Overutilization may lead to performance degradation, while underutilization indicates potential efficiency improvements. Rule complexity metrics evaluate the complexity of the rules themselves. Complex rules may require more processing time and resources. Identifying overly complex rules can lead to rule optimization efforts. Hit rate measures the percentage of rules or conditions that are triggered (i.e., true) relative to the total number of rules or conditions evaluated. A high hit rate suggests that most rules are relevant and effectively contribute to decision-making. In applications where the rule engine must filter content, the false positive rate measures how often the engine incorrectly flags non-objectionable content as objectionable. Lower false positive rates are generally desirable. The false negative rate assesses how often the engine fails to identify objectionable content when it is present. Lower false negative rates are typically preferred. Rule authoring time measures the time it takes to create or update rules. Faster rule authoring can lead to more efficient rule management and quicker adaptation to changing requirements. The number and frequency of errors encountered during rule execution, such as syntax errors or runtime exceptions, provide insights into the reliability and stability of the rule engine. Rule coverage measures the percentage of cases or scenarios for which rules provide decisions or actions. High rule coverage indicates that the rule engine effectively handles a wide range of situations. The rule engine's overall response time, including the time it takes to receive, evaluate, and respond to a request, is a crucial performance metric for applications that require real-time decision-making. These performance metrics help rule engine administrators and developers assess the efficiency and quality of the rule engine's operations. Optimizing the rule engine based on these metrics can lead to faster decision-making, better resource utilization, and improved system performance. The specific metrics of interest may vary depending on the application and use case of the rule engine.

System 200 may then receive a model deployment criterion (e.g., criterion 270). For example, system 200 may receive one or more criteria that indicate when a new model (e.g., a modified rule engine) should be deployed. For example, the model deployment criteria may refer to the set of criteria or conditions that must be met before a model is deployed into a production environment (e.g., the existing rule engine is replaced). These criteria serve as guidelines and standards to ensure that the deployed model is effective, reliable, secure, and aligned with the intended business or application objectives. Model deployment criteria are important to maintain the quality and performance of the deployed model and to mitigate potential risks.

The model deployment criteria may be key to a difference between outputs. For example, the system may determine a difference between two outputs and may compare that difference to a threshold difference to determine whether to deploy the new model. The model deployment criteria may be based on any of the differences detected as discussed herein. For example, training artificial intelligence models can be computationally expensive and time-consuming. Similarly, rerunning a model (whether it requires additional training or not) requires significant computational resources, including high-performance hardware like GPUs or TPUs. It also demands electricity and can contribute to a larger carbon footprint due to increased energy consumption. To minimize the expensive, time, and/or computational resources, the system may only deploy a new model, generate modified rules, and/or other execute one or more processes based on one or more criteria.

In some embodiments in which the difference is determined, the system may compare the difference to a threshold difference. For example, the criterion may indicate a difference in a value against which the proxy model may be measured to determine when, if ever, the proxy model should be deployed to replace the existing rule engine. The criterion may be keyed to the differences between the two outputs (e.g., a difference in its size, throughput speed, number of changes, etc.), the existing rule engine and the model (e.g., based on a difference in its age, update occurrences to its rule base, etc.), and/or comparisons between outputs of the models (e.g., based on differences in results, throughput speed, efficiency, etc.). For example, as opposed to directly comparing the modified rule engine to the existing rule engine, or even an output of the modified rule engine to an output of the existing rule engine, the system compares a difference in the outputs to the model deployment criterion.

In some embodiments, the threshold difference may be determined based on a third party request, an industry standard, a predetermined frequency, and/or in response to another trigger. For example, if a third party requests a threshold difference, it might involve manual intervention where a human expert or administrator sets the threshold based on specific requirements provided by the requester. Alternatively, models can be trained to analyze historical data or patterns to suggest suitable thresholds based on the request's context. In another example, industries often have established standards or regulations dictating certain thresholds for different parameters or metrics. The system can be programmed with these standards, and when a request aligns with the industry standards, the system can automatically apply those predefined thresholds. In some embodiments, setting thresholds based on a predetermined frequency involves monitoring data at regular intervals and modifying thresholds accordingly. The system can analyze historical data, calculate statistical measures like mean, median, standard deviation, or use time-series analysis to determine thresholds at specified intervals. In some embodiments, the system may dynamically adjust thresholds based on triggers or events. For example, if a sudden spike in data occurs, the system might automatically adjust the threshold to account for the anomaly. This adaptive threshold determination could be based on outlier detection algorithms, anomaly detection techniques, or real-time monitoring systems.

In some embodiments, the system may combine these approaches. For example, the system may rely on predefined rules that take into account third-party requests, industry standards, and/or predetermined frequencies to set thresholds. For instance, if a request specifies a particular condition, a rule-based system can be designed to accommodate it. In another example, the system may be trained on historical data that includes thresholds set in the past based on various triggers or industry standards. These models can learn patterns and relationships to suggest or adjust thresholds when similar conditions are encountered.

In some embodiments, the system may analyze the results of validation checks to identify patterns and anomalies, indicating potential weaknesses, and/or gaps in the rules. Based on this analysis, the system may suggest refinements to the rules, optimizing their effectiveness, and/or reducing false positives. As a practical example, after a security breach, the system may analyze the attack vectors and refine validation rules. For example, if a SQL injection attack occurred, the system might suggest refining input validation rules to detect and block similar injection attempts, reducing the risk of future exploits. Additionally or alternatively, the system may anticipate potential security risks and generate rules to mitigate those risks before they become exploited. For instance, the system may identify emerging attack patterns and generate rules that block or flag similar inputs, preventing potential attacks before they occur. As a practical example, the system may analyze historical data and identifies a rising trend in cross-site scripting (XSS) attacks. The system proactively generates rules to block or sanitize input containing suspicious JavaScript code, preventing potential XSS attacks before they are attempted.

Figure 2B:
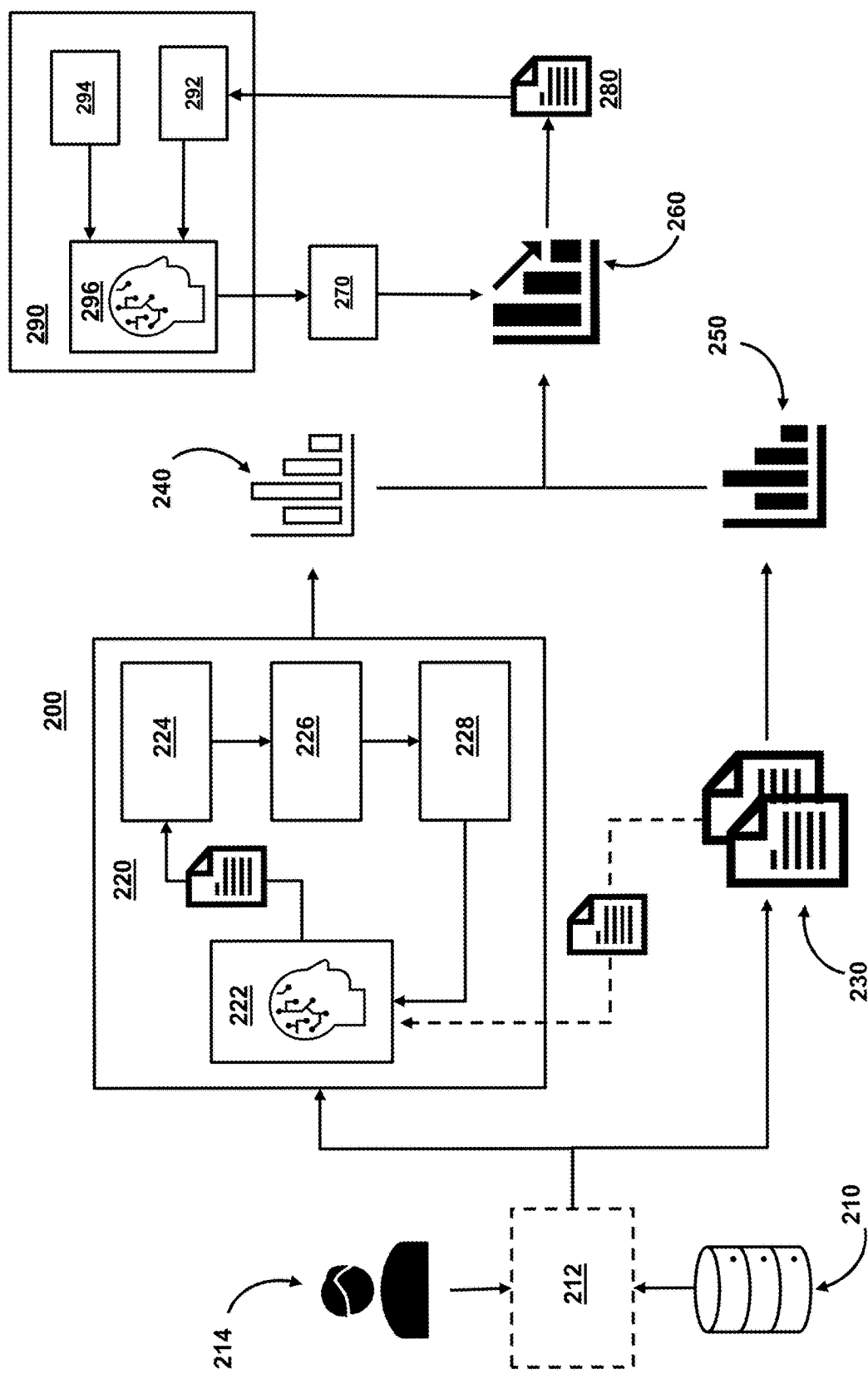
FIG. 2B shows an illustrative diagram for modifying decision engines during software development, in accordance with one or more further embodiments.

FIG. 2B is an illustrative diagram for modifying decision engines during software development, according to further embodiments. Components illustrated in FIG. 2B have similar functionality to components described with respect to FIG. 2A, and thus discussion of these components has been omitted for clarity. However, FIG. 2B further illustrates that the system 200 can include a deployment criterion engine 290 that modifies deployment criteria.

As described with respect to FIG. 2A, a deployment criterion 270 is used to determine when to deploy a modified decision engine. A decision made by the selection engine 260 results in the system 200 deploying a decision engine 280. The selection engine 260 determines a difference between an output generated by an existing decision engine and an output generated by a modified decision engine and, based on whether the difference satisfies the deployment criterion 270, the system 200 deploys either the existing decision engine or the modified decision engine to process subsequent data items. For example, a modified decision engine is deployed as a deployed engine 280 when a KPI or set of KPIs associated with the modified decision engine satisfy the deployment criterion 270, such as a given KPI being greater than a threshold specified by the deployment criterion 270 or a given KPI being less than a specified threshold. If the modified decision engine does not satisfy the deployment criterion, deployment of the existing decision engine is maintained. The deployment criterion 270 can include more than one criteria against which respective KPIs are compared to evaluate whether a modified decision engine should be deployed as engine 280. In this case, a modified decision engine can be deployed when, for example, a KPI in a set of KPIs associated with the modified decision engine satisfies at least one criterion within the deployment criterion 270, a set of associated KPIs each satisfy all of the criteria in the deployment criterion 270, or the set of associated KPIs satisfy at least a specified number of the criteria in the deployment criterion 270.

The deployment criterion engine 290 periodically modifies the deployment criterion 270 to modify the KPIs produced by decision engines. As shown in FIG. 2B, the deployment criterion engine 290 can include a metric generator 292 and a criterion generator 296.

The metric generator 292 generates a metric based on outputs produced by one or more deployed decision engines 280 as the decision engines 280 process data items. The metric can relate to a comparison of outputs generated by various deployed decision engines 280 over time. In an example, after a modified decision engine is deployed, the metric generator 292 compares a set of outputs generated by the modified decision engine to a set of outputs generated by the existing decision engine most recently used. For example, the metric generator 292 compares an average value of the outputs produced by the modified decision engine in a specified time period after deployment of the modified decision engine, to an average value of the outputs produced by the last-deployed existing decision engine over another specified time period. The metric generator 292 generates a metric based on this comparison. Examples of this metric can include a difference between the outputs (e.g., the difference between the average value of the outputs from the modified decision engine and the average value of the outputs from the existing decision engine), a comparison of minimum/maximum outputs generated by each engine, a comparison of a distribution of the outputs from each engine, or the like. Alternatively, the metric can be a value that is computed based on the outputs themselves or based on actions resulting from the outputs, such as a frequency at which certain outputs or actions result, an analysis of a statistical distribution of outputs or actions, or a monetary cost incurred by the actions. In still other cases, the metric can relate to an analysis of the way decision engines themselves are deployed. For example, a metric can indicate how frequently a decision engine is being modified based on current deployment criteria.

In one example, the system 200 generates decision engines that process transaction data, such as credit card transaction data, to assess whether a requested transaction is likely to be fraudulent. Credit card transactions can be vulnerable to fraud because they are often anonymously conducted, and are readily initiated based on information that is vulnerable to misappropriation. To protect holders of credit cards and reduce the number of fraudulent transactions, a credit card processing system uses decision engines in real-time to process data associated with a requested transaction in order to predict whether the requested transaction is fraudulent. These decision engines use a set of rules that cause the credit card processing system to output a determination that a transaction is likely fraudulent or likely not fraudulent based on the transaction data. Based on this output, an action can be taken, such as denying a transaction that has been determined to be fraudulent or authorizing a transaction that has been determined to be not fraudulent. The system 200 periodically deploys new decision engines with new rules that result in some variations in the types and numbers of transactions that are labeled fraudulent. These variations can be used as the basis for computing a metric associated with the deployed decision engines. Some example metrics generated by the metric generator 292 are metrics based on transaction data of the transactions that are or are not labeled fraudulent. For example, the metric generator 292 can compare features of a transaction labeled as fraudulent by an existing decision engine to features of a transaction labeled fraudulent by a modified decision engine. The metric can relate, for example, to the number of features of these two transactions that are different or the number of features that are the same, or can be a characterization of the types of features that are possessed by both transactions or only one of the two transactions. Other example metrics generated by the metric generator 292 are metrics based on actions taken based on the decision engines' outputs, such as the denial or authorization of transactions that are labeled fraudulent or not fraudulent. For example, a metric can relate to a percentage of requested transactions that are denied before and after a modified decision engine is deployed, an assessment of a number of incorrectly labeled transactions (e.g., by comparing a number of fraud mitigation requests that are initiated by credit card holders before and after deployment of a modified decision engine), or a measure of profitability of a set of credit card transactions (e.g., balancing revenues earned from each completed credit card transaction against losses from fraudulent transactions and the cost to execute a given decision engine).

The criterion generator 296 modifies the deployment criterion 270 when the metric output by the metric generator 292 satisfies a condition 294. The condition 294 can specify, for example, that a deployment criterion should be modified when a metric is above a specified threshold or below a specified threshold, or when a metric satisfies a qualitative assessment. Human input can further be used as the condition 294 for triggering modification of the deployment criterion 270. The criterion generator 296 can include a generative model, such as an LLM, that evaluates the metric, the deployment criterion 270, and current or previously deployed decision engines to generate a recommendation for modifications to the deployment criterion 270 that will result in changes to the metric or that will achieve another specified goal. The generative model used by the criterion generator 296 can be the same model as the generative model 222 or a different model. In some embodiments, the recommendation output by the generative model can be reviewed by a human in the loop to confirm that the modified deployment criterion meets a goal of an organization or does not conflict with other goals.

Modifying the deployment criterion 270 can entail, in some cases, modifying a threshold to which a given KPI or set of KPIs is compared. For example, if the deployment criterion 270 causes a modified decision engine to be deployed when the modified decision engine runs 10% faster than an existing decision engine, the deployment criterion 270 can be modified to increase or decrease this speed threshold (e.g., such that a modified engine is deployed when it runs only 8% faster than the existing engine). In other cases, modifying the deployment criterion 270 can entail modifying a set of KPIs that are evaluated as part of the deployment criterion 270, such as adding KPIs to this set, removing KPIs from the set, combining KPIs within this set, or splitting a KPI into two or more new KPIs. For example, continuing the credit card fraud example discussed above, the criterion generator 296 can generate deployment criteria based on a metric of profitability of a credit card program. Profitability can be influenced by a variety of factors, including the number of credit card transactions that are completed (e.g., due to revenue resulting from each transaction), the number of transactions that are fraudulent but incorrectly labeled as non-fraudulent (e.g., due to losses incurred from reimbursing victims of fraud), the number of transactions that are not fraudulent but incorrectly labeled as fraudulent (e.g., due to opportunity cost of not gaining revenue from the transaction), the size of the decision engine (e.g., due to the computing costs to process transaction data through the engine, or due to slowed transaction speed caused by processing transaction data through a large engine), and so forth. The deployment criterion 270 used to deploy new fraud detection decision engines can include KPIs related to some or all of these factors, and thus modifying the deployment criterion 270 can include modifying these KPIs or thresholds corresponding to these KPIs. For example, if a first deployment criterion 270 causes a new decision engine to be deployed only based on the number of transactions that are authorized (e.g., resulting in a new decision engine deployment when the new engine increases the number of authorized transactions by a specified threshold), the criterion generator 296 may recommend adding criteria that relate to one or more of the other factors affecting profitability. These criteria can be recommended for inclusion in the deployment criterion based on observing how these criteria affect the overall metric of profitability resulting from the transactions processed through decision engines.

Example Decision Engine Generators

Figure 3A:
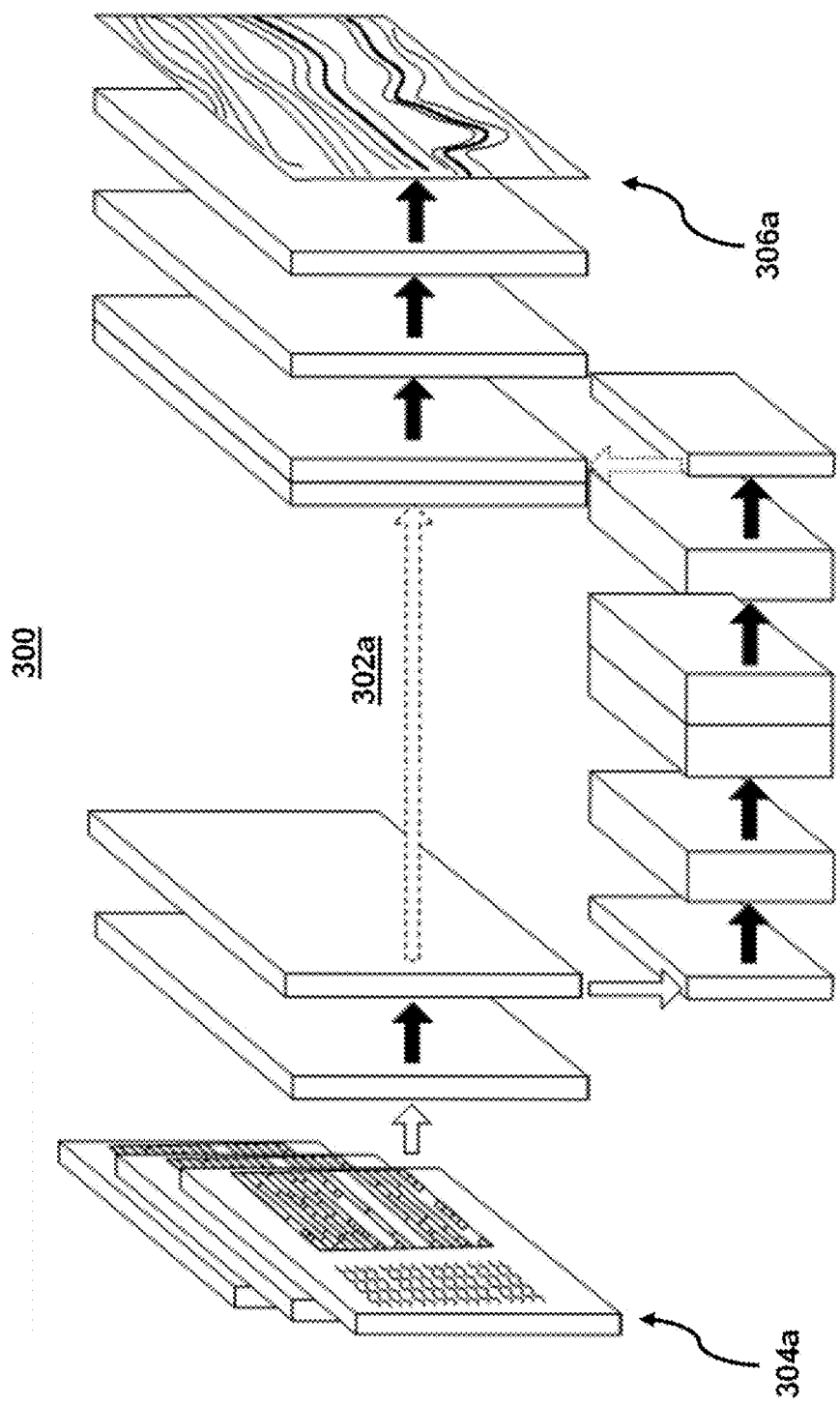
FIGS. 3A-B show illustrative components for a system used to generate modified rule engines, in accordance with one or more embodiments.
Figure 3B:
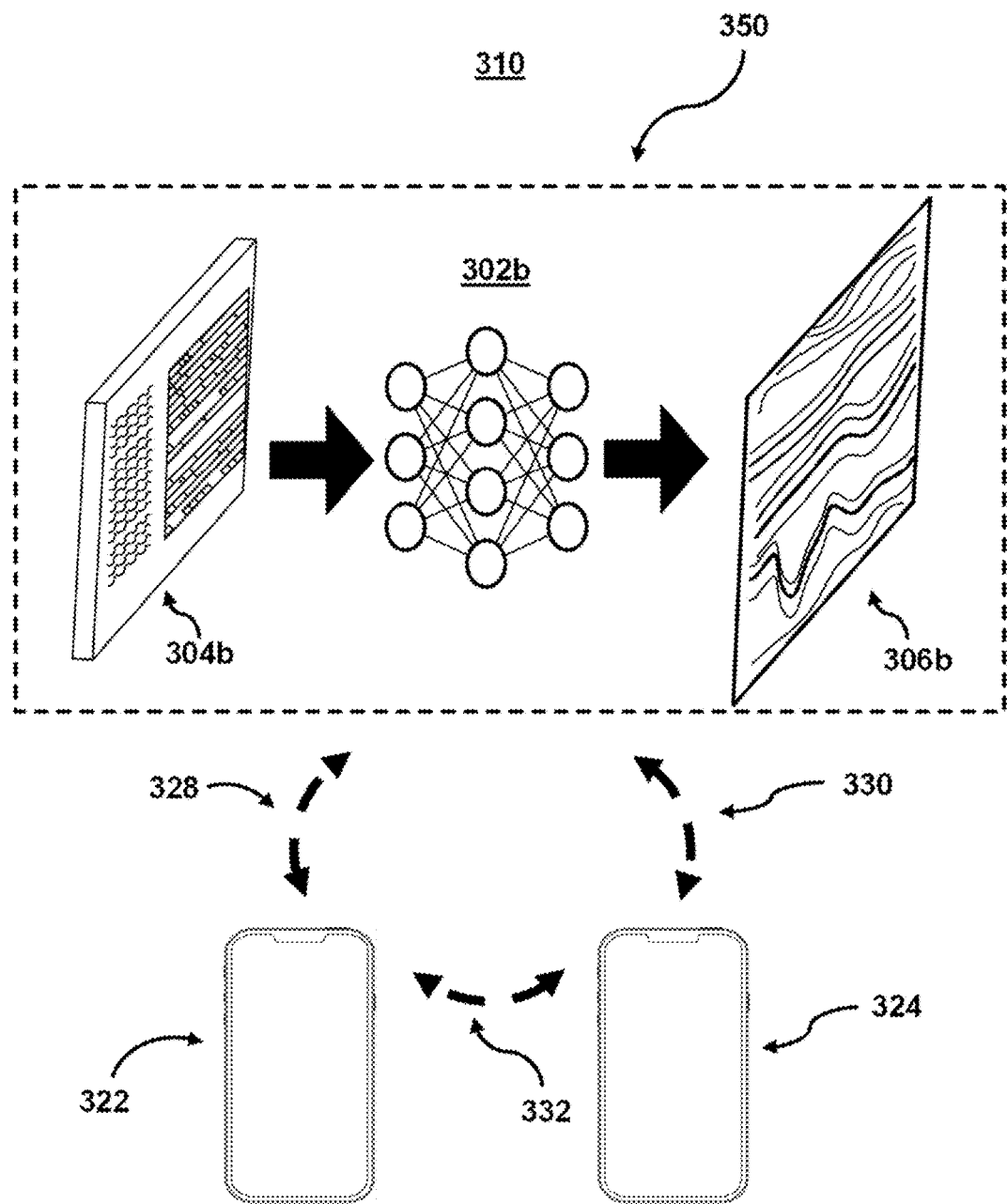

FIGS. 3A-B show illustrative components for a system used to generate modified rule engines, in accordance with one or more embodiments. For example, FIG. 3A may represent a model architecture used to generate modified rule engine script. A software development workflow, also known as a software development process or software development lifecycle (SDLC), may be a systematic series of steps, phases, or activities that guide the creation, testing, deployment, and maintenance of software applications (e.g., a rule engine). It may provide a structured framework for managing the development of software from initial concept to the final product. Different organizations and teams may adopt various software development workflows, depending on their specific needs, methodologies, and project requirements.

System 300 includes model 302a, which may be a machine learning model, an artificial intelligence model, etc. (which may be referred to collectively as "models" herein). Model 302a may take inputs 304a and provide outputs 306a. The inputs may include multiple datasets, such as a training dataset and a test dataset. Each of the plurality of datasets (e.g., inputs 304a) may include data subsets related to user data, predicted forecasts and/or errors, and/or actual forecasts and/or errors. In some embodiments, outputs 306a may be fed back to model 302a as input to train model 302a (e.g., alone or in conjunction with user indications of the accuracy of outputs 306a, labels associated with the inputs, or other reference feedback information). For example, the system may receive a first labeled feature input, wherein the first labeled feature input is labeled with a known prediction for the first labeled feature input. The system may then train the first model to classify the first labeled feature input with the known prediction (e.g., generate a modified rule engine script).

In a variety of embodiments, model 302a may update its configurations (e.g., weights, biases, or other parameters) based on the assessment of its prediction (e.g., outputs 306a) and reference feedback information (e.g., user indication of accuracy, reference labels, or other information). In a variety of embodiments, where model 302a is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302a may be trained to generate better predictions.

In some embodiments, the model (e.g., model 302a) may automatically perform actions based on output 306a. In some embodiments, the model (e.g., model 302a) may not perform any actions. The output of the model (e.g., model 302a) may be used to generate a modified rule engine script. For example, model 302a may comprise an artificial intelligence model that determines a first modified script for a first modified rule engine based on a first script extracted from a first existing rule engine. The artificial intelligence model may be trained to generate rule engine script based on comparisons of historic script interpretations of historic rule bases for historic rule engines.

FIG. 3B shows illustrative components for a system used to determine when to deploy a modified rule engine, in accordance with one or more embodiments. For example, FIG. 3B may show illustrative components for generating a modified rule engine script. As shown in FIG. 3B, system 310 may include user device 322 and user device 324. While shown as smartphones in FIG. 3B, it should be noted that user device 322 and user device 324 may be any computing device, including, but not limited to, a laptop computer, a tablet computer, a hand-held computer, and other computer equipment (e.g., a server), including "smart," wireless, wearable, and/or mobile devices. System 310 may also include cloud components. For example, cloud components may be implemented as a cloud computing system, and may feature one or more component devices. It should be noted that, while one or more operations are described herein as being performed by particular components of system 310, these operations may, in some embodiments, be performed by other components of system 310. As an example, while one or more operations are described herein as being performed by components of user device 322, these operations may, in some embodiments, be performed by cloud components. In some embodiments, the various computers and systems described herein may include one or more computing devices that are programmed to perform the described functions. Additionally, or alternatively, multiple users may interact with system 310 and/or one or more components of system 310.

With respect to the components of user device 322 and user device 324, each of these devices may receive content and data via I/O paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3B, both user device 322 and user device 324 include a display upon which to display data.

Additionally, as user device 322 and user device 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 310 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3B also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

System 310 also includes API layer 350. API layer 350 may allow the system to generate summaries across different devices. In some embodiments, API layer 350 may be implemented on user device 322 or user device 324. Alternatively or additionally, API layer 350 may reside on one or more components of system 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 310 may be partially based on API layer 350, such that there is strong adoption of SOAP and RESTful Web services, using resources like Service Repository and Developer Portal, but with low governance, standardization, and separation of concerns. Alternatively, system 310 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

As shown in FIG. 3B, in some embodiments, model 302b may be trained by taking inputs 304b and provide outputs 306b. Model 302b may include an artificial neural network. In such embodiments, model 302b may include an input layer and one or more hidden layers. Each neural unit of model 302b may be connected with many other neural units of model 302b. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302b may be self-learning and trained, rather than explicitly programmed, and can perform significantly better in certain areas of problem-solving, as compared to traditional computer programs. During training, an output layer of model 302b may correspond to a classification of model 302b, and an input known to correspond to that classification may be input into an input layer of model 302b during training. During testing, an input without a known classification may be input into the input layer, and a determined classification may be output.

In some embodiments, model 302b may include multiple layers (e.g., where a signal path traverses from front layers to back layers). In some embodiments, backpropagation techniques may be utilized by model 302b where forward stimulation is used to reset weights on the "front" neural units. In some embodiments, stimulation and inhibition for model 302b may be more free-flowing, with connections interacting in a more chaotic and complex fashion. During testing, an output layer of model 302b may indicate whether or not a given input corresponds to a classification of model 302b (e.g., generate a modified rule engine script).

Model 302b is shown as a convolutional neural network. A convolutional neural network consists of an input layer (e.g., input 304a), hidden layers, and an output layer (e.g., output 306b). As shown in FIG. 3B, the middle layers are called hidden because their inputs and outputs are masked by the activation function and final convolution. In a convolutional neural network, the hidden layers include layers that perform convolutions. Model 302b may comprise convolutional layers that convolve the input and pass its result to the next layer. Model 302b includes local and/or global pooling layers along with traditional convolutional layers. Pooling layers reduce the dimensions of data by combining the outputs of neuron clusters at one layer into a single neuron in the next layer. Also as shown, model 302b may comprise fully connected layers that connect every neuron in one layer to every neuron in another layer.

Modifying Decision Engines During Software Development

Figure 4:
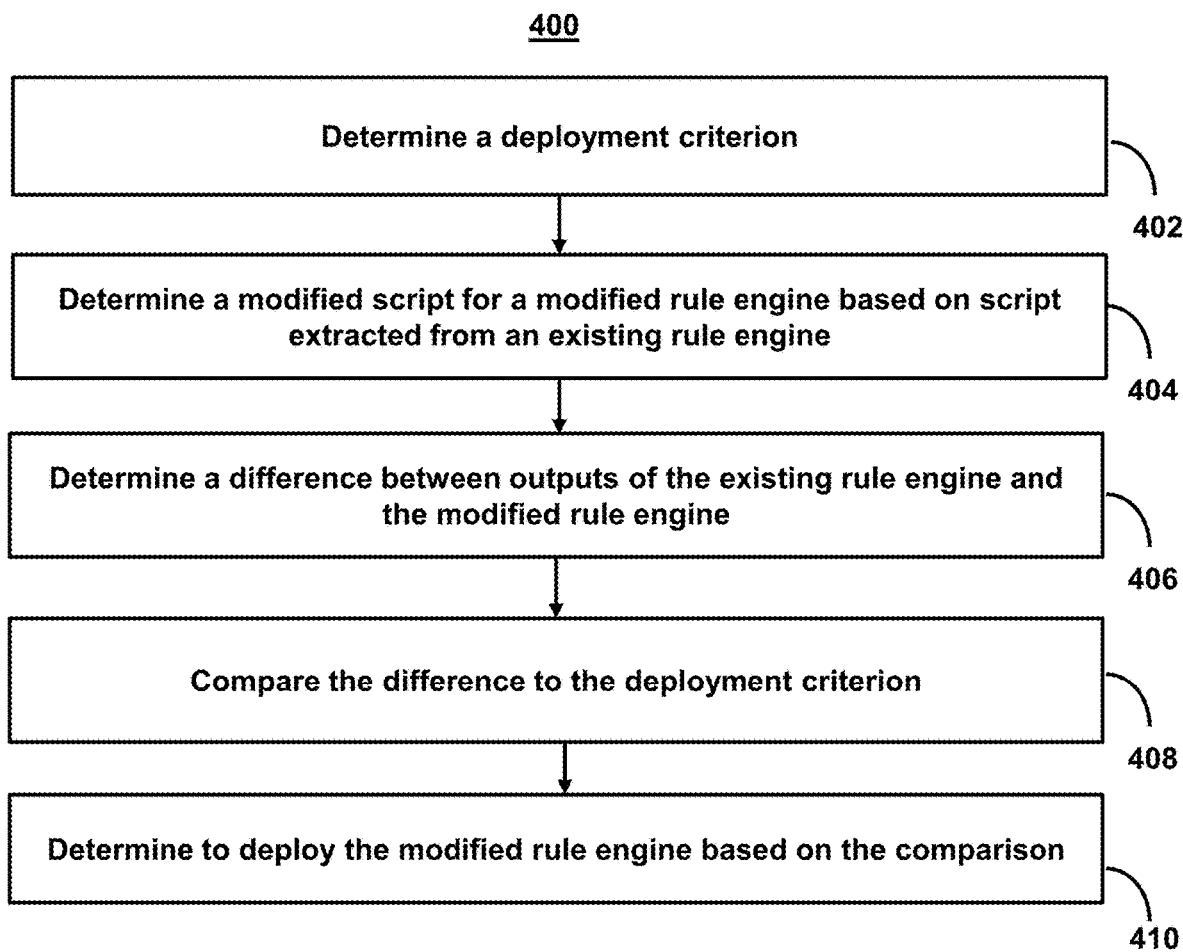
FIG. 4 shows a flowchart of the steps involved in modifying rule engines during software development using generated proxy models, in accordance with one or more embodiments.

FIG. 4 shows a flowchart of the steps involved in modifying decision engines during software development using generated proxy models, in accordance with one or more embodiments. FIG. 4 describes steps for modifying rule engines, as an example type of decision engine. For example, the system may use process 400 (e.g., as implemented on one or more system components described above) in order to modify rule engines using generated proxy models with predefined model deployment criteria that mimics formats and structures of existing rule engines. Similar processes can be used to modify other types of decision engines.

At step 402, process 400 (e.g., using one or more components described above) determines a deployment criterion. For example, the system may determine a first model deployment criterion based on a user input (e.g., into a user interface), based on a rule engine, and/or based on some other factor. As a practical example, a continuous rule monitoring module within an application may identify a novel SQL injection technique called "Double Encoding Injection." This discovery is based on information found in manual updates, media articles, threat intelligence feeds, vulnerability reports, and/or other sources. Double encoding injection may involve exploiting input validation by using double encoding on certain characters, making them appear harmless to traditional validation checks. The system may generate a deployment criterion that corresponds to whether or not existing script is susceptible to double encoding injection.

For example, the deployment criterion may comprise a criterion to determine when an existing rule engine should receive a modification. The deployment criterion may be based on a difference (e.g., in accuracy, performance, validations, robustness, security, compliance, scalability, latency, throughput, etc.) between outputs. For example, the model should meet predefined accuracy and performance thresholds. These metrics may vary depending on the specific use case but are essential to ensure that the model can effectively perform its intended task. Additionally or alternatively, the model may undergo thorough validation and testing procedures, including cross-validation, holdout testing, and evaluation against a validation dataset, to verify its generalization performance. Additionally or alternatively, the model may be tested for robustness and resilience against various types of data, including noisy, missing, or out-of-distribution data. It should perform reliably under different conditions. Additionally or alternatively, the model may be assessed for potential security risks, such as vulnerability to adversarial attacks, data leakage, and unauthorized access. Security measures should be in place to protect the model and the data it processes. Additionally or alternatively, the model may adhere to relevant legal and regulatory requirements, such as data protection and privacy laws, industry-specific standards, and ethical guidelines. Compliance with regulations such as GDPR, HIPAA, or industry-specific regulations is essential. Additionally or alternatively, the model may be capable of scaling to handle the expected workload in a production environment. Scalability tests should ensure that the model can meet performance requirements as the data volume and user load increase. Additionally or alternatively, the model's response time (latency) and its ability to handle a specific number of requests per unit of time (throughput) may be evaluated to ensure it can meet real-time or near-real-time processing requirements.

At step 404, process 400 (e.g., using one or more components described above) determines a modified script for a modified rule engine based on script extracted from an existing rule engine. For example, the system may determine, using a first artificial intelligence model, a first modified script for a first modified rule engine based on a first script extracted from a first existing rule engine, wherein the first artificial intelligence model is trained to generate rule engine script based on comparisons of historic script interpretations of historic rule bases for historic rule engines. For example, the model may compare historical data to make predictions by learning patterns and relationships within the historical data. The model is trained using the historical data and associated labels by adjusting the model's parameters to minimize the difference between its predictions and the actual outcomes in the training data. As a practical example, the system may analyze a researcher's report, understanding that an attacker that employs double encoding on SQL-related keywords and characters such as a single quotation mark of a semicolon. In response the system may generate new rules. For example, a first rule may check for double encoding of SQL keywords ('SELECT', 'INSERT', 'UPDATE', etc.). A second rule may detect and block input with double-encoded special characters like %2527 (encoded single quote) and %253B (encoded semicolon).

In some embodiments, determining the first modified script for the first modified rule engine based on the first script extracted from the first existing rule engine may comprise the system determining a first scripting language for the first script. The system may determine a first efficiency of the first scripting language. The system may determine a second scripting language that comprises a second efficiency. The system may determine to generate the first modified script in the second scripting language based on the second efficiency exceeding the first efficiency. In some embodiments, determining the first efficiency of the first scripting language may comprise the system determining a level of compatibility of the first scripting language with other script in the first existing rule engine. The system may determine the first efficiency based on the level of compatibility. In some embodiments, determining the first efficiency of the first scripting language may comprise the system comparing a performance characteristic of the first scripting language with other script in the first existing rule engine. The system may determine the first efficiency based on the performance characteristic.

In some embodiments, determining the first modified script for the first modified rule engine based on the first script extracted from the first existing rule engine may comprise the system determining a first function in the first script, wherein the first function has a first script length. The system may determine a second function for the first modified script, wherein the second function has a second script length, and wherein the second script length is shorter than the first script length.

In some embodiments, determining the first modified script for the first modified rule engine based on the first script extracted from the first existing rule engine may comprise the system determining a hard-coded number string in the first script. The system may determine a named constant corresponding to the hard-coded number string. The system may replace the hard-coded number string with the named constant in the first modified script.

In some embodiments, determining the first modified script for the first modified rule engine based on the first script extracted from the first existing rule engine may comprise the system determining a first class in the first script. The system may determine a second class corresponding to the first class. The system may replace the first class with the second class in the first modified script.

In some embodiments, determining the first modified script for the first modified rule engine based on the first script extracted from the first existing rule engine may comprise the system determining a syntax in the first modified script. The system may validate the first modified script based on the syntax.

In some embodiments, determining the first modified script for the first modified rule engine based on the first script extracted from the first existing rule engine may comprise determining a dependency in the first modified script. The system may validate the first modified script based on the dependency.

At step 406, process 400 (e.g., using one or more components described above) determines a difference between outputs of the existing rule engine and the modified rule engine. For example, the system may input first rule base data into the first existing rule engine, wherein the first existing rule engine processes the first rule base data to generate a first output. The system may input the first rule base data into the first modified rule engine, wherein the first modified rule engine processes the first rule base data with the first modified script to generate a first modified output. The system may determine a first difference between the first output and the first modified output. As a practical example, the system may determine that existing rules check for traditional SQL injection patterns, but do not account for the aforementioned double encoding.

At step 408, process 400 (e.g., using one or more components described above) compares the difference to the deployment criterion. For example, the system may compare the first difference to the first model deployment criterion. In some embodiments, the deployment criterion may comprise a threshold difference between two outputs. For example, comparing the first difference to the first model deployment criterion may comprise the system determining a threshold hit rate difference. The system may then compare the threshold hit rate difference to the first difference. As a practical example, the system may determine that the fact that the existing rules check for traditional SQL injection patterns, but do not account for the aforementioned double encoding corresponds to a deployment criterion.

In some embodiments, determining the first difference between the first output and the first modified output may comprise the system determining a first hit rate for the first existing rule engine in the first output. The system may determine a second hit rate for the first modified rule engine in the first modified output. The system may determine the first difference based on the first hit rate and the second hit rate. In some embodiments, determining the first difference between the first output and the first modified output may comprise the system determining a first performance metric for the first existing rule engine in the first output. The system may determine a second performance metric for the first modified rule engine in the first modified output. The system may determine the first difference based on the first performance metric and the second performance metric. In some embodiments, determining the first difference between the first output and the first modified output may comprise the system determining a first number of errors in the first output. The system may determine a second number of errors in the first modified output. The system may determine the first difference based on the first number of errors and the second number of errors.

In some embodiments, determining the first difference between the first output and the first modified output may comprise the system determining a first variable in the first output. The system may determine a second variable in the first modified output. The system may determine the first difference based on the first variable and the second variable.

At step 410, process 400 (e.g., using one or more components described above) determines to deploy the modified rule engine based on the comparison. For example, the system may determine whether to deploy the first modified rule engine based on comparing the first difference to the first model deployment criterion. In some embodiments, deploying the first modified rule engine may comprise replacing the first existing rule engine with the first modified rule engine to generate a second existing rule engine. Additionally or alternatively, the system may determine a second model deployment criterion. For example, the system may continuously train and/or determine when to deploy a new rule engine. As a practical example, the system may evaluate the current rules and identifies a gap in handling double-encoded characters as described above. In response the system may deploy the modified rule and/or suggests modifications. For example, the system may update a rule to strengthen existing checks for single-encoded SQL keywords. As another example, the system may introduce checks specifically looking for double-encoded characters in input. In such cases, an automated system may integrate the new and updated rules into the application's input validation module. Now, the application is equipped to detect and prevent the "Double Encoding Injection" technique.

In some embodiments, the system may continuously monitor and/or perform continuous learning and improvement. For example, the application may log attempted attacks, including any instances of the double encoding injection technique as well as new vectors for attacks. These logs may be used to determine new deployment criteria. For example, the system may feed this information back into a model, allowing it to refine its understanding of emerging threats and further enhance rule generation. As the model identifies new attack vectors or variations, the system may automatically generate updated rules. These rules may be seamlessly integrated into the validation process, ensuring ongoing protection against evolving security threats.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Figure 5:
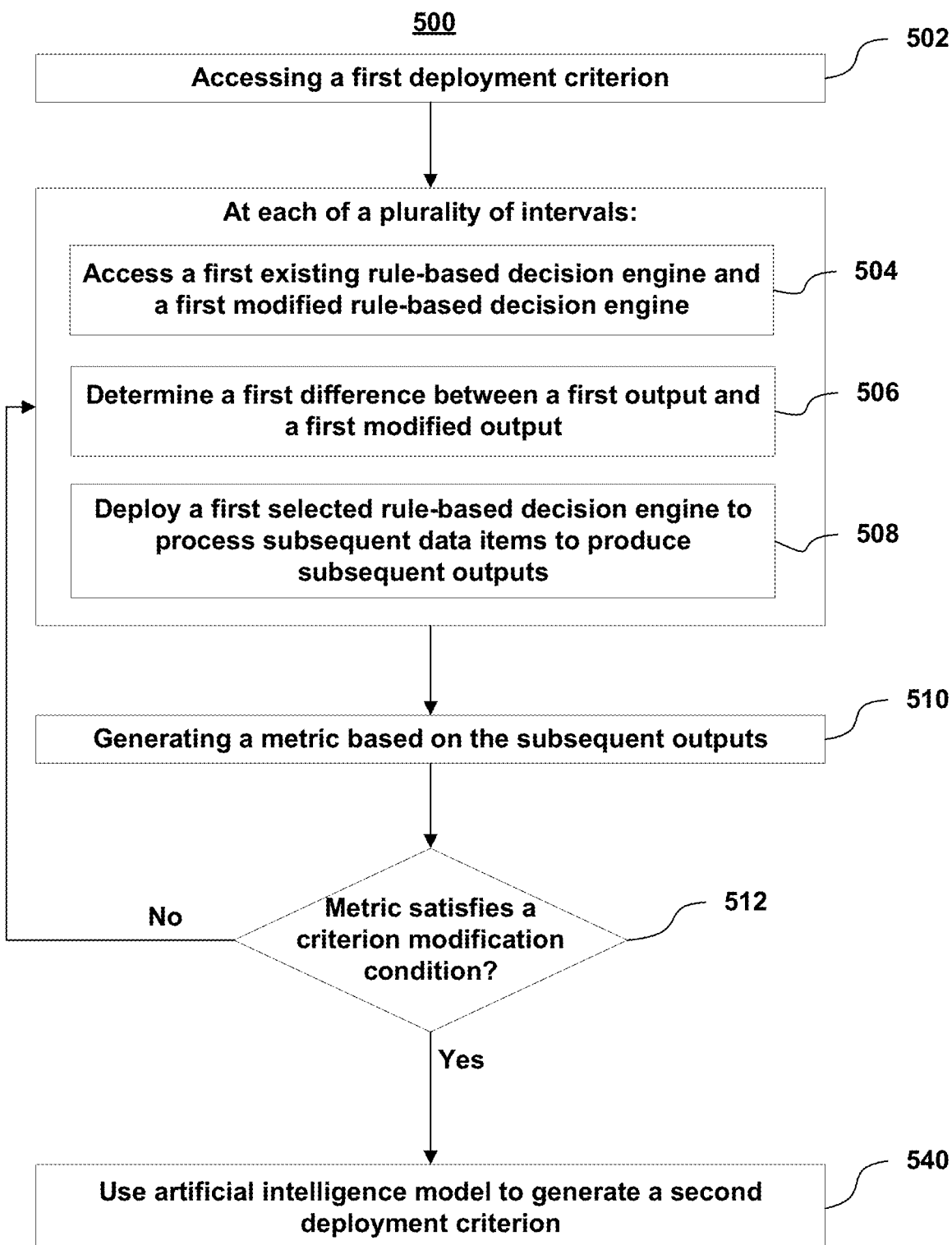
FIG. 5 shows a flowchart of the steps involved in modifying decision engines during software development using variable deployment criteria, in accordance with one or more embodiments.

FIG. 5 shows a flowchart of steps involved in modifying rule engines during software development using variable deployment criteria, in accordance with one or more embodiments. For example, the system may use process 500 (e.g., as implemented on one or more system components described above) in order to modify decision engines using generated proxy models that mimic formats and structures of existing rule engines, as well as to modify the deployment criteria by which the decision engines are modified.

At operation 502, process 500 (e.g., using one or more components described above) accesses a first deployment criterion. At each of a plurality of intervals, process 500 uses the first deployment criterion to select a decision engine that is to be deployed to process data and make decisions based on the data.

For example, at operation 504, process 500 accesses a first existing rule-based decision engine and a first modified rule-based decision engine. The first modified rule-based decision engine includes rule data that was generated by an artificial intelligence model based on the first existing rule-based decision engine, such as to modify an existing rule in the first existing rule-based decision engine, to add a rule to the first existing rule-based decision engine, or to remove a rule from the first existing rule-based decision engine. The rule data is data that is actionable by a computer system to process data and compute a decision that satisfies one or more conditions within the rule data.

At operation 506, process 500 determines a first difference between a first output and a first modified output, where the first existing rule-based decision engine processes a first data item to generate the first output, and where the first modified rule-based decision engine processes the first data item with the rule data to generate the first modified output.

At operation 508, process 500 deploys a first selected rule-based decision engine to process subsequent data items to produce subsequent outputs. The first selected rule-based decision engine can be selected for deployment between the first existing rule-based decision engine and the first modified rule-based decision engine. For example, the first existing rule-based decision engine is deployed when the first difference does not satisfy the first deployment criterion, and the first modified rule-based decision engine when the first difference satisfies the first deployment criterion.

At operation 510, process 500 (e.g., using one or more components described above) generates a metric based on the subsequent outputs generated by the deployed decision engine. The metric can be computed based on a comparison of a first set of outputs from the first existing rule-based decision engine and a second set of outputs from the first modified rule-based decision engine. Alternatively, the metric can be computed based on the outputs from the deployed decision engine itself or actions taken based on the outputs from the deployed decision engine. For example, process 500 can generate a metric based on a first set of actions performed in response to a first set of outputs from the deployed decision engine.

At operation 512, process 500 determines whether the metric satisfies a criterion modification condition. If the metric does not satisfy the criterion modification condition, process 500 returns to operation 504 to await a new modified rule-based decision engine. If the metric does satisfy the condition, process 500 uses the artificial intelligence model to generate a second deployment criterion that is different from the first deployment criterion.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for modifying rule-based decision engines during software development, comprising: accessing a first deployment criterion; at each of a plurality of intervals: accessing a first existing rule-based decision engine and a first modified rule-based decision engine, wherein the first modified rule-based decision engine include an actionable rule that was generated by an artificial intelligence model based on the first existing rule-based decision engine; determining a first difference between a first output and a first modified output, wherein the first existing rule-based decision engine processes a first data item to generate the first output, and wherein the first modified rule-based decision engine processes the first data item with the actionable rule to generate the first modified output; deploying a first selected rule-based decision engine to process subsequent data items to produce subsequent outputs, wherein deploying the first selected rule-based decision engine comprises: deploying the first existing rule-based decision engine when the first difference does not satisfy the first deployment criterion, and deploying the first modified rule-based decision engine when the first difference satisfies the first deployment criterion; generating a metric based on the subsequent outputs; and when the metric satisfies a criterion modification condition, using the artificial intelligence model to generate a second deployment criterion, wherein a second selected rule-based decision engine is deployed based on a comparison between the second deployment criterion and a second difference between: (i) a second output generated by a second existing rule-based decision engine and (ii) a second modified output generated by a second modified rule-based decision engine.

2. The method of the previous embodiment, wherein generating the metric based on the subsequent outputs comprises: comparing a first set of outputs from the first existing rule-based decision engine to a second set of outputs from the first modified rule-based decision engine; and generating the metric based on the comparison.

3. The method of any of the previous embodiments, wherein generating the metric based on the subsequent outputs comprises: detecting a first set of actions performed in response to a first set of outputs from the first selected rule-based decision engine; and generating the metric based on the first set of actions.

4. The method of any of the previous embodiments, wherein the first set of actions comprise actions authorizing requested transactions, and wherein generating the metric based on the first set of actions comprises: detecting an incidence of fraudulent transactions from among the authorized transactions; and computing a profitability of the first set of actions based on a revenue received from each authorized transaction and based on losses incurred from the fraudulent transactions.

5. The method of the previous embodiment, wherein the criterion modification condition specifies a threshold profitability, and wherein the artificial intelligence model is used to generate the second deployment criterion in response to the computed profitability being less than the threshold profitability.

6. The method of any of the previous embodiments, wherein the artificial intelligence model is a large language model (LLM), and wherein the method further comprises: generating a prompt to the LLM to cause the LLM to generate the rule data, wherein the prompt identifies one or more data sources, and wherein the LLM is configured to use the one or more data sources when generating the rule data.

7. The method of any of the previous embodiments, wherein the artificial intelligence model is a large language model (LLM), and wherein the method further comprises: generating a prompt to the LLM that instructs the LLM to generate: the rule data to enact a rule, and a reasoned explanation for the rule.

8. The method of any of the previous embodiments, wherein the first deployment criterion comprises a first threshold to which the first difference is compared; and wherein the second deployment criterion comprises a second threshold, different from the first threshold, to which the second difference is compared.

9. The method of any of the previous embodiments: wherein the first deployment criterion comprises a set of first thresholds to which each of a plurality of first differences between the first output and the first modified output are compared; and wherein the second deployment criterion comprises at least one of: a modification of one of the first thresholds in the set of first thresholds to a second threshold; an addition of a second threshold to the set of first thresholds; or a removal of one of the first thresholds from the set of first thresholds.

10. A tangible, non-transitory, computer-readable medium storing instructions that, when executed by a data processing apparatus, cause the data processing apparatus to perform operations comprising those of any of embodiments 1-19.

11. A system comprising one or more processors; and memory storing instructions that, when executed by the processors, cause the processors to effectuate operations comprising those of any of embodiments 1-19.

12. A system comprising means for performing any of embodiments 1-19.

What is claimed is:

1. A system for modifying rule-based decision engines during software development, the system comprising:
one or more processors; and
one or more non-transitory, computer-readable media comprising instructions recorded thereon that when executed by the one or more processors cause the one or more processors to perform operations comprising:
accessing a first deployment criterion;
at each of a plurality of intervals:
accessing a first existing rule-based decision engine and a first modified rule-based decision engine, wherein the first modified rule-based decision engine includes rule data that was generated by an artificial intelligence model to modify an existing rule in the first existing rule-based decision engine, wherein the artificial intelligence model generates the rule data by modifying script extracted from the first existing rule-based decision engine to add a first rule to the first existing rule-based decision engine or to remove a second rule from the first existing rule-based decision engine;
determining a first difference between a first output and a first modified output, wherein the first existing rule-based decision engine processes a first data item to generate the first output, and wherein the first modified rule-based decision engine processes the first data item with the rule data to generate the first modified output;
deploying a first selected rule-based decision engine to process subsequent data items to produce subsequent outputs, wherein deploying the first selected rule-based decision engine comprises:
deploying the first existing rule-based decision engine when the first difference does not satisfy the first deployment criterion, and
deploying the first modified rule-based decision engine when the first difference satisfies the first deployment criterion;
generating a metric based on the subsequent outputs; and
when the metric satisfies a criterion modification condition, using the artificial intelligence model to generate a second deployment criterion, wherein a second selected rule-based decision engine is deployed based on a comparison between the second deployment criterion and a second difference between: (i) a second output generated by a second existing rule-based decision engine and (ii) a second modified output generated by a second modified rule-based decision engine.

2. The system of claim 1, wherein generating the metric based on the subsequent outputs comprises:
comparing a first set of outputs from the first existing rule-based decision engine to a second set of outputs from the first modified rule-based decision engine; and
generating the metric based on the comparison.

3. The system of claim 1, wherein generating the metric based on the subsequent outputs comprises:
detecting a first set of actions performed in response to a first set of outputs from the first selected rule-based decision engine; and
generating the metric based on the first set of actions.

4. The system of claim 3, wherein the first set of actions comprise actions authorizing requested transactions, and wherein generating the metric based on the first set of actions comprises:
detecting an incidence of fraudulent transactions from among the authorized requested transactions; and
computing a profitability of the first set of actions based on a revenue received from each authorized transaction and based on losses incurred from the fraudulent transactions.

5. The system of claim 4, wherein the criterion modification condition specifies a threshold profitability, and wherein the artificial intelligence model is used to generate the second deployment criterion in response to the computed profitability being less than the threshold profitability.

6. The system of claim 1, wherein the artificial intelligence model is a large language model (LLM), and wherein the instructions further cause the one or more processors to perform operations comprising:
generating a prompt to the LLM to cause the LLM to generate the rule data, wherein the prompt identifies one or more data sources, and wherein the LLM is configured to use the one or more data sources when generating the rule data.

7. The system of claim 1, wherein the artificial intelligence model is a large language model (LLM), and wherein the instructions further cause the one or more processors to perform operations comprising:
generating a prompt to the LLM that instructs the LLM to generate:
the rule data to enact a rule, and
a reasoned explanation for the rule.

8. The system of claim 1:
wherein the first deployment criterion comprises a first threshold to which the first difference is compared; and
wherein the second deployment criterion comprises a second threshold, different from the first threshold, to which the second difference is compared.

9. The system of claim 1:
wherein the first deployment criterion comprises a set of first thresholds to which each of a plurality of first differences between the first output and the first modified output are compared; and
wherein the second deployment criterion comprises at least one of:
a modification of one of the set of first thresholds in the set of first thresholds to the second threshold;
an addition of the second threshold to the set of first thresholds; or
a removal of one of the set of first thresholds from the set of first thresholds.

10. A method for modifying rule-based decision engines during software development, comprising:
accessing a first deployment criterion;
at each of a plurality of intervals:
accessing a first existing rule-based decision engine and a first modified rule-based decision engine, wherein the first modified rule-based decision engine includes an actionable rule that was generated by an artificial intelligence model based on the first existing rule-based decision engine, wherein the artificial intelligence model generates the actionable rule by modifying script extracted from the first existing rule-based decision engine;

determining a first difference between a first output and a first modified output, wherein the first existing rule-based decision engine processes a first data item to generate the first output, and wherein the first modified rule-based decision engine processes the first data item with the actionable rule to generate the first modified output;

deploying a first selected rule-based decision engine to process subsequent data items to produce subsequent outputs, wherein deploying the first selected rule-based decision engine comprises:

deploying the first existing rule-based decision engine when the first difference does not satisfy the first deployment criterion, and deploying the first modified rule-based decision engine when the first difference satisfies the first deployment criterion;

generating a metric based on the subsequent outputs; and when the metric satisfies a criterion modification condition, using the artificial intelligence model to generate a second deployment criterion, wherein a second selected rule-based decision engine is deployed based on a comparison between the second deployment criterion and a second difference between: (i) a second output generated by a second existing rule-based decision engine and (ii) a second modified output generated by a second modified rule-based decision engine.

11. The method of claim 10, wherein generating the metric based on the subsequent outputs comprises:

comparing a first set of outputs from the first existing rule-based decision engine to a second set of outputs from the first modified rule-based decision engine; and generating the metric based on the comparison.

12. The method of claim 10, wherein generating the metric based on the subsequent outputs comprises:

detecting a first set of actions performed in response to a first set of outputs from the first selected rule-based decision engine; and generating the metric based on the first set of actions.

13. The method of claim 10, wherein the artificial intelligence model is a large language model (LLM), and wherein the method further comprises:

generating a prompt to the LLM to cause the LLM to generate the actionable rule, wherein the prompt identifies one or more data sources, and wherein the LLM is configured to use the one or more data sources when generating the actionable rule.

14. The method of claim 10, wherein the artificial intelligence model is a large language model (LLM), and wherein the method further comprises:

generating a prompt to the LLM that instructs the LLM to generate:

the actionable rule to enact a rule, and a reasoned explanation for the rule.

15. The method of claim 10:

wherein the first deployment criterion comprises a set of first thresholds to which each of a plurality of first differences between the first output and the first modified output are compared; and wherein the second deployment criterion comprises at least one of:

a modification of one of the set of first thresholds in the set of first thresholds to a second threshold;

an addition of the second threshold to the set of first thresholds; or a removal of one of the set of first thresholds from the set of first thresholds.

16. One or more non-transitory, computer-readable media comprising instructions recorded thereon that when executed by one or more processors cause the one or more processors to perform operations comprising:

accessing a first deployment criterion, wherein the first deployment criterion comprises a first threshold;

at each of a plurality of intervals:

accessing a first existing rule-based decision engine and a first modified rule-based decision engine, wherein the first modified rule-based decision engine includes an actionable rule that was generated by an artificial intelligence model based on the first existing rule-based decision engine;

determining a first difference between a first output and a first modified output, wherein the first existing rule-based decision engine processes a first data item to generate the first output, and wherein the first modified rule-based decision engine processes the first data item with the actionable rule to generate the first modified output;

deploying a first selected rule-based decision engine to process subsequent data items to produce subsequent outputs, wherein deploying the first selected rule-based decision engine comprises:

deploying the first existing rule-based decision engine when the first difference does not satisfy the first deployment criterion, and deploying the first modified rule-based decision engine when the first difference satisfies the first deployment criterion;

generating a metric based on the subsequent outputs; and when the metric satisfies a criterion modification condition, using the artificial intelligence model to generate a second deployment criterion, wherein the second deployment criterion comprises a second threshold, wherein a second selected rule-based decision engine is deployed based on a comparison between the second deployment criterion and a second difference between: (i) a second output generated by a second existing rule-based decision engine and (ii) a second modified output generated by a second modified rule-based decision engine.

17. The one or more non-transitory, computer-readable media of claim 16, wherein generating the metric based on the subsequent outputs comprises:

comparing a first set of outputs from the first existing rule-based decision engine to a second set of outputs from the first modified rule-based decision engine; and generating the metric based on the comparison.

18. The one or more non-transitory, computer-readable media of claim 16, wherein generating the metric based on the subsequent outputs comprises:

detecting a first set of actions performed in response to a first set of outputs from the first selected rule-based decision engine; and generating the metric based on the first set of actions.

19. The one or more non-transitory, computer-readable media of claim 16, wherein the artificial intelligence model is a large language model (LLM), and wherein the instructions further cause the one or more processors to perform operations comprising:

generating a prompt to the LLM to cause the LLM to generate the actionable rule, wherein the prompt identifies one or more data sources, and wherein the LLM is configured to use the one or more data sources when generating the actionable rule.

20. The one or more non-transitory, computer-readable media of claim 16, wherein the artificial intelligence model is a large language model (LLM), and wherein the instructions further cause the one or more processors to perform operations comprising:

generating a prompt to the LLM that instructs the LLM to generate:

the actionable rule to enact a rule, and a reasoned explanation for the rule.

* * * * *